(12) United States Patent
Yamade

(10) Patent No.: US 8,401,411 B2
(45) Date of Patent: Mar. 19, 2013

(54) IMAGE FORMING APPARATUS AND PRINTING CONTROL METHOD

(75) Inventor: Yasushi Yamade, Yokohama (JP)

(73) Assignee: Konica Minolta Business Technologies, Inc. (JP)

( * ) Notice: Subject to any disclaimer, the term of this patent is extended or adjusted under 35 U.S.C. 154(b) by 553 days.

(21) Appl. No.: 12/723,959

(22) Filed: Mar. 15, 2010

(65) Prior Publication Data

US 2010/0239275 A1    Sep. 23, 2010

(30) Foreign Application Priority Data

Mar. 18, 2009    (JP) .................................. 2009-066011

(51) Int. Cl.
  *G03G 15/08*    (2006.01)
(52) U.S. Cl. ............................... 399/54; 399/39; 399/82
(58) Field of Classification Search ................. 399/39, 399/54, 82
  See application file for complete search history.

(56) References Cited

U.S. PATENT DOCUMENTS

2010/0226665 A1*  9/2010  Yamade ........................ 399/39

FOREIGN PATENT DOCUMENTS

| JP | 2002-182634 A | 6/2002 |
|----|---------------|--------|
| JP | 2006-148831 A | 6/2006 |
| JP | 2006-235520 A | 9/2006 |
| JP | 2007-121618 A | 5/2007 |

OTHER PUBLICATIONS

Notice of Reasons for Refusal for Japanese Application No. 2009-066011 with English translation drafted on Nov. 24, 2010.

* cited by examiner

*Primary Examiner* — Walter L Lindsay, Jr.
*Assistant Examiner* — Ruth Labombard
(74) *Attorney, Agent, or Firm* — Cantor Colburn LLP

(57) ABSTRACT

An image forming apparatus having a printing section loaded with a first toner group, and a second toner group having a higher chroma value than the first toner group; and a control section which is configured to: convert color information of each part of an image based on image data specified by a print job into values in a prescribed color space; make a first judgment of a toner group proper to the image by comparing the values in the prescribed color space with color reproducible range of previously registered each toner group; make a second judgment of the toner group proper to a recording sheet and/or a printing condition which being specified by the print job, by referring to previously stored correlation information; and determine the toner group to be used for printing the image, based on results of the first and second judgments.

14 Claims, 20 Drawing Sheets

FIG. 23

|  |  | COATED PAPER | HIGH QUALITY PAPER | THICK PAPER WITH HIGH WHITENESS | RECYCLED PAPER, COLOR PAPER |
|---|---|---|---|---|---|
| SINGLE FACE PRINT | 1 SHEET | VIVID TONER | VIVID TONER | VIVID TONER | NORMAL TONER |
|  | PLURAL SHEETS | VIVID TONER | NORMAL TONER | VIVID TONER | NORMAL TONER |
| DOUBLE FACE PRINT |  | NORMAL TONER | NORMAL TONER | VIVID TONER | NORMAL TONER |

IMAGE FORMING APPARATUS AND PRINTING CONTROL METHOD

CROSS REFERENCE TO RELATED APPLICATION

The present application is based on Japanese Patent Application No. 2009-066011 filed with Japanese Patent Office on Mar. 18, 2009, the entire content of which is hereby incorporated by reference.

BACKGROUND OF THE INVENTION

1. Field of Technology

The present invention relates to an image forming apparatus, a printing control method, and particularly to an image forming apparatus which is provided with a plurality of types of toner groups each having different color reproducible range, and a print control method utilizing said image forming apparatus.

2. Description of Prior Art

Printing apparatuses including printers and digital multifunctional peripherals (herein after referred as image forming apparatus) have been commonly utilized. The image forming apparatus, forms an image based on a print job sent from a computer terminal, forms an electrostatic latent image by irradiating a light beams on an electrostatically charged photosensitive material according to the image, develops the latent image by applying a charged toner to form a toner image, and transfers the toner image onto a sheet of paper via a transfer roller or a transfer member such as an intermediate transfer belt.

Materials such as the toner utilized in the image forming apparatus respectively have color characteristics, including the color characteristic which is easy or not easy for reproducing a specific color. Therefore, in cases of image formation, in order to reproduce the color of an original image with high fidelity as far as possible, prescribed image processing has been implemented by considering the color characteristics of the materials.

For example, Unexamined Japanese Patent Application Publication No. 2002-182634 discloses a color reproduction processing switching apparatus which automatically recognizes an image characteristics of a subject image, and switches to the most appropriate color reproduction processing (or color matching) system in accordance with the image characteristics.

In this way, by switching the color reproduction system according to the image characteristics, it may be possible to reproduce colors close to that of the original image. However, each toner group composed of CMY or CMYK toners has a color domain of reproducible color (to be referred as reproducible color range), and in cases where the original image contains a color beyond the color reproducible range, the desired original color image may not be reproduced.

SUMMARY

Due to these backgrounds, in recent years, a toner group (referred as a "Vivid toner") which can reproduce a more bright color with high chroma value than a conventionally used toner group (referred as a "Normal toner") has been developed. By utilizing the image forming apparatus loading the Vivid toner, the color outside the reproducible range of the Normal toner can be more truly reproduced.

However, since the Vivid toner is more expensive than the Normal toner, the print cost may be increased by using the Vivid toner, in cases where the original image is configured of reproducible color by both the Vivid color and the normal color (the color within the reproducible color areas of both toners). Further, even in cases where the original image contains a color reproducible by Vivid toner, depending on characteristics of recording sheet (glossiness, whiteness, thickness, etc.) or printing conditions (single face/double face type, single sheet/double sheet configuration, etc.), characteristics of the Vivid toner may not be effectively exploited. In those cases, the printing cost may be increased by conducting the print with the use of Vivid toner.

Therefore, in order to suppress the print cost and effectively exploit the characteristics of Vivid toner, it is preferable to select a toner group according to the original image color, the sheet characteristics and the printing conditions. However, there has not been image forming apparatus provided with the plurality of types of toner group, method to select an appropriate toner group based on the original image color and a color reproducible range of the toner group, or method to select an appropriate toner group based on the sheet characteristics and printing conditions, therefore the above described problems have not been solved.

The present invention has been performed in view of the above problem, and its main objective is to provide an image forming apparatus and a printing control method, which enable to effectively utilize toners of high chroma values with suppressing the printing cost.

An image forming apparatus reflecting one aspect of the present invention to achieve the above-mentioned objective is provided with a printing section loaded with a first toner group, and a second toner group having a higher chroma value than the first toner group; and a control section which is configured to:

convert color information of each part of an image based on image data specified by a print job into values in a prescribed color space;

make a first judgment of a toner group proper to the image by comparing the values in the prescribed color space with color reproducible range of previously registered each toner group of the first and second toner groups;

make a second judgment of the toner group proper to a recording sheet and/or a printing condition which being specified by the print job, by referring to previously stored correlation information; and determine the toner group to be used for printing the image, based on results of the first and second judgments.

A printing control method reflecting another aspect of the present invention is a control method for a system including an image forming apparatus provided with a printing section loaded with a first toner group, and a second toner group having a higher chroma value than the first toner group, the control method includes the steps of:

converting color information of each part of an image based on image data specified by a print job into values in a prescribed color space;

making a first judgment of a toner group proper to the image by comparing the values in the prescribed color space with color reproducible range of previously registered each toner group of the first and second toner groups;

making a second judgment of the toner group proper to a recording sheet and/or a printing condition which being specified by the print job, by referring to previously stored correlation information; and determining the toner group to be used for printing the image, based on results of the first and second judgments.

BRIEF DESCRIPTION OF THE DRAWINGS

These and other objects, advantages and features of the invention will become apparent from the following description thereof taken in conjunction with the accompanying drawings in which:

FIG. 23 is a configuration example of a table specifying corresponding relationships of sheets and print conditions between toners.

DETAILED DESCRIPTION OF THE PREFERRED EMBODIMENTS

As described in the description of prior art, the image forming apparatus loaded with Vivid toners is able to reproduce bright colors having higher chroma value than the image forming apparatus loaded with conventionally used Normal toner. However, since the Vivid toner is more costly than the Normal toner, in cases where a color is reproducible by both the Vivid and Normal toners, it is preferable to print the color with the Normal toner. Further even in cases where the image includes a color is reproducible only by the Vivid toner, depending on properties of a recording sheet or printing conditions characteristics of the Vivid toner cannot be effectively utilized. In such cases it is also preferable to use the Normal toner for printing.

In an embodiment of the present invention, the image forming apparatus is loaded with a plurality of types of toner group: a first toner group (for example, Normal toner) and second toner group (for example, Vivid toner) having higher chroma (wider reproducible range) than the first toner group.

Further, the image forming apparatus of the above configuration, by converting the image data of print subject with a prescribed unit (for example, with a Bit unit) into data of a prescribed color space (for example, Lab value), and determining where the data of the color space belongs among the areas of color reproducible range of each toner group, judges whether the color requiring high chroma toner group is included in the image of the print subject.

Further, based on the properties of the designated sheet (glossiness, whiteness or thickness, etc.) or printing conditions (the type of single side printing or double sides, single sheet/plural sheets, etc.) the image forming apparatus judges whether the high chroma toner group can be effectively utilized or not, and controls to execute printing by determining the toner group to be utilized based on the judgment.

According to the above described image forming apparatus, it becomes possible to suppress the printing cost to the minimum necessary, and utilize the high chroma toner effectively.

[Embodiment]

Figure 1:
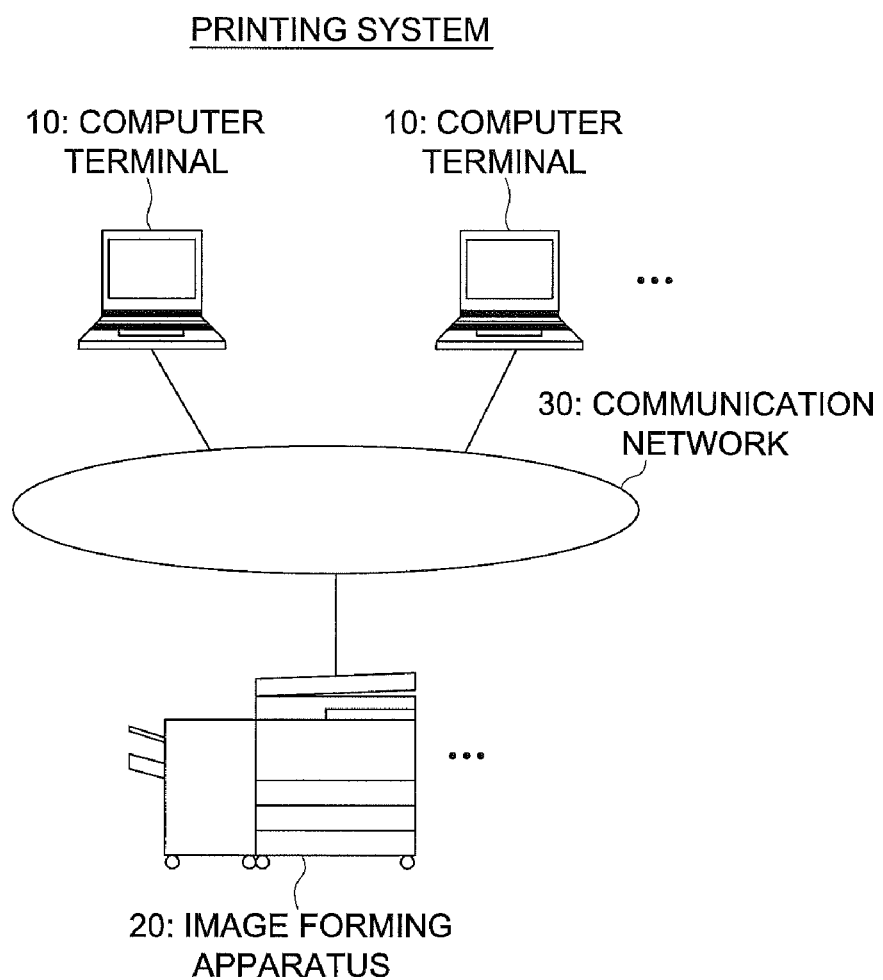
FIG. 1 is a diagram showing a configuration example of a printing system relating to an embodiment of the present invention.
Figure 2:
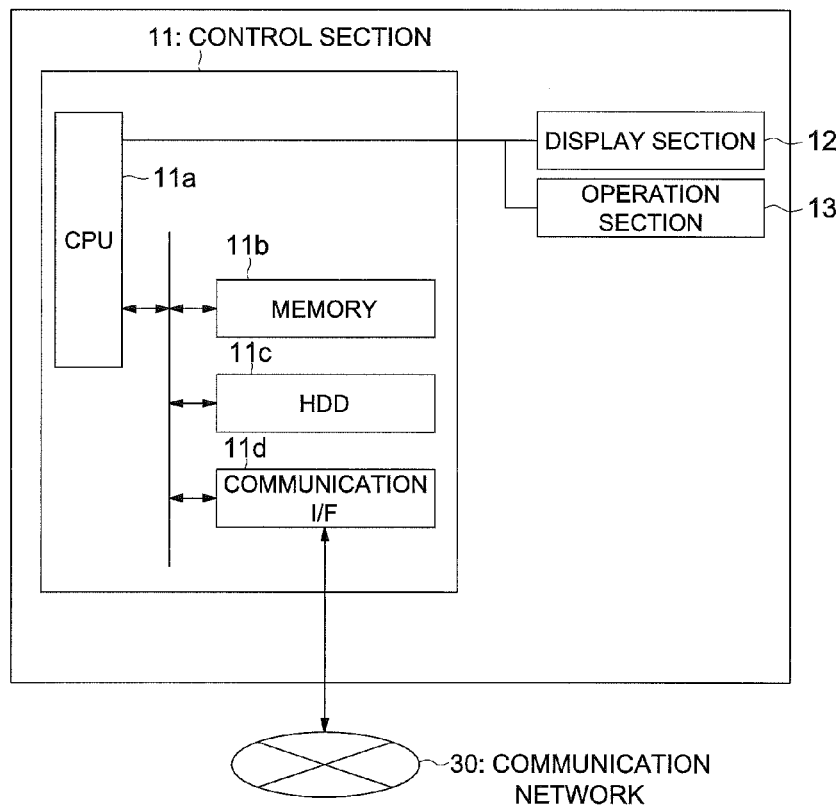
FIG. 2 is a block diagram showing a configuration of a computer terminal relating to an embodiment of the present invention.
Figure 3:
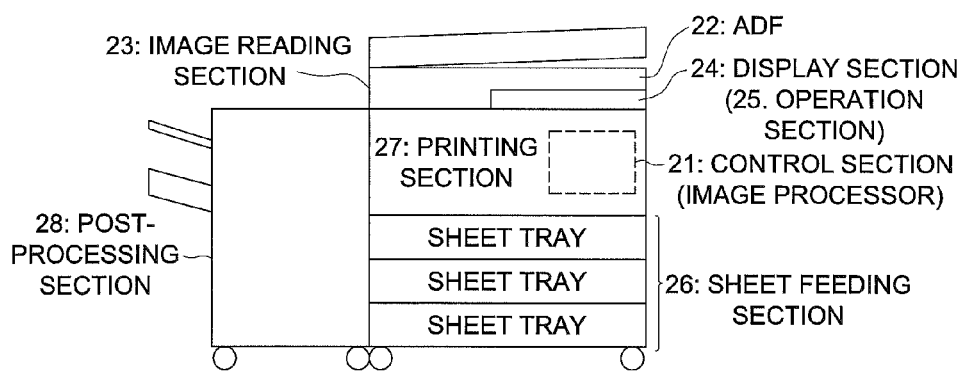
FIG. 3 is a schematic diagram showing a configuration of an image forming apparatus relating to an embodiment of the present invention.
Figure 4:
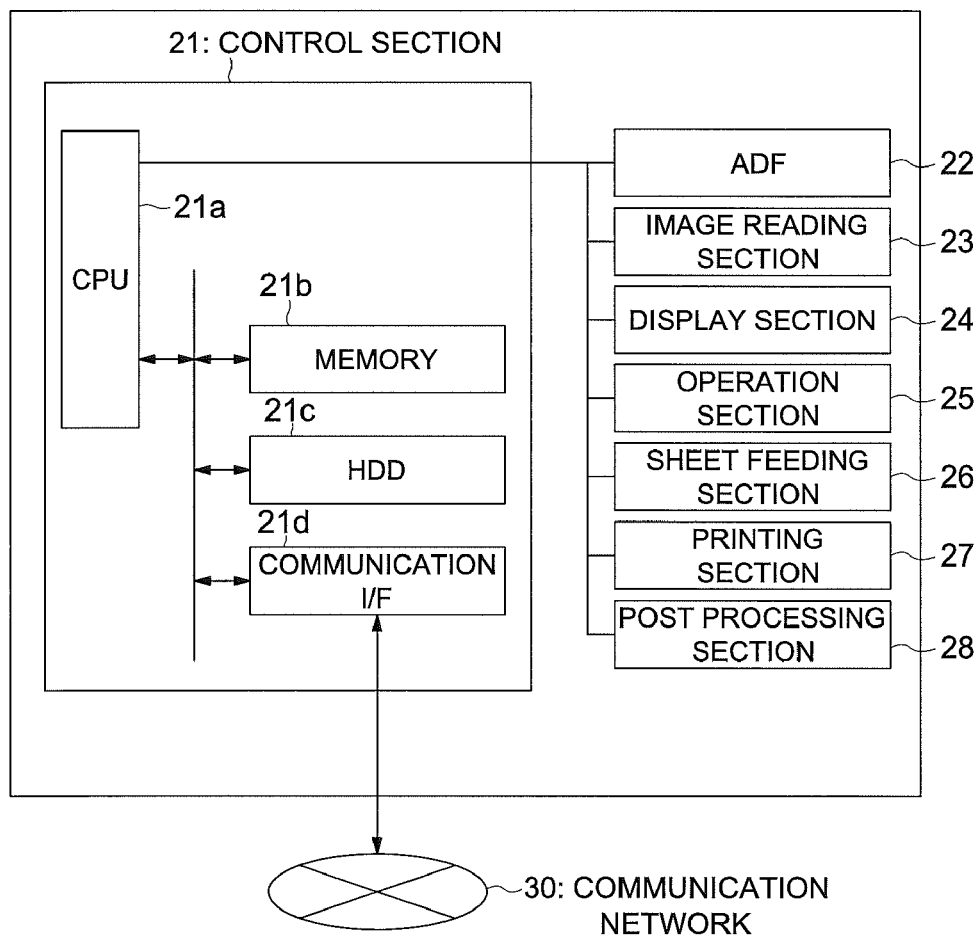
FIG. 4 is a block diagram showing a configuration of an image forming apparatus relating to an embodiment of the present invention.
Figure 8:
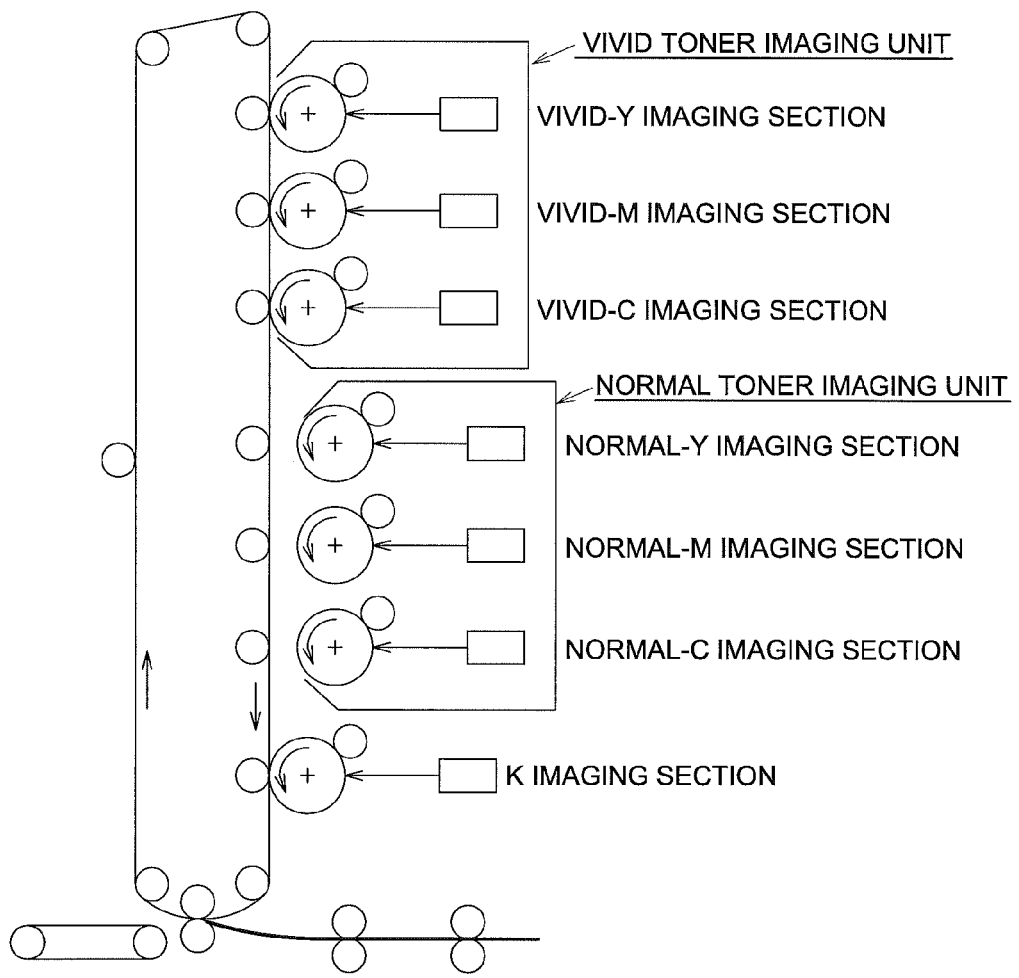
FIG. 8 is a diagram showing a status of a printing section, where a Normal toner imaging unit is retracted, of an image forming apparatus relating to an embodiment of the present invention.
Figure 9:
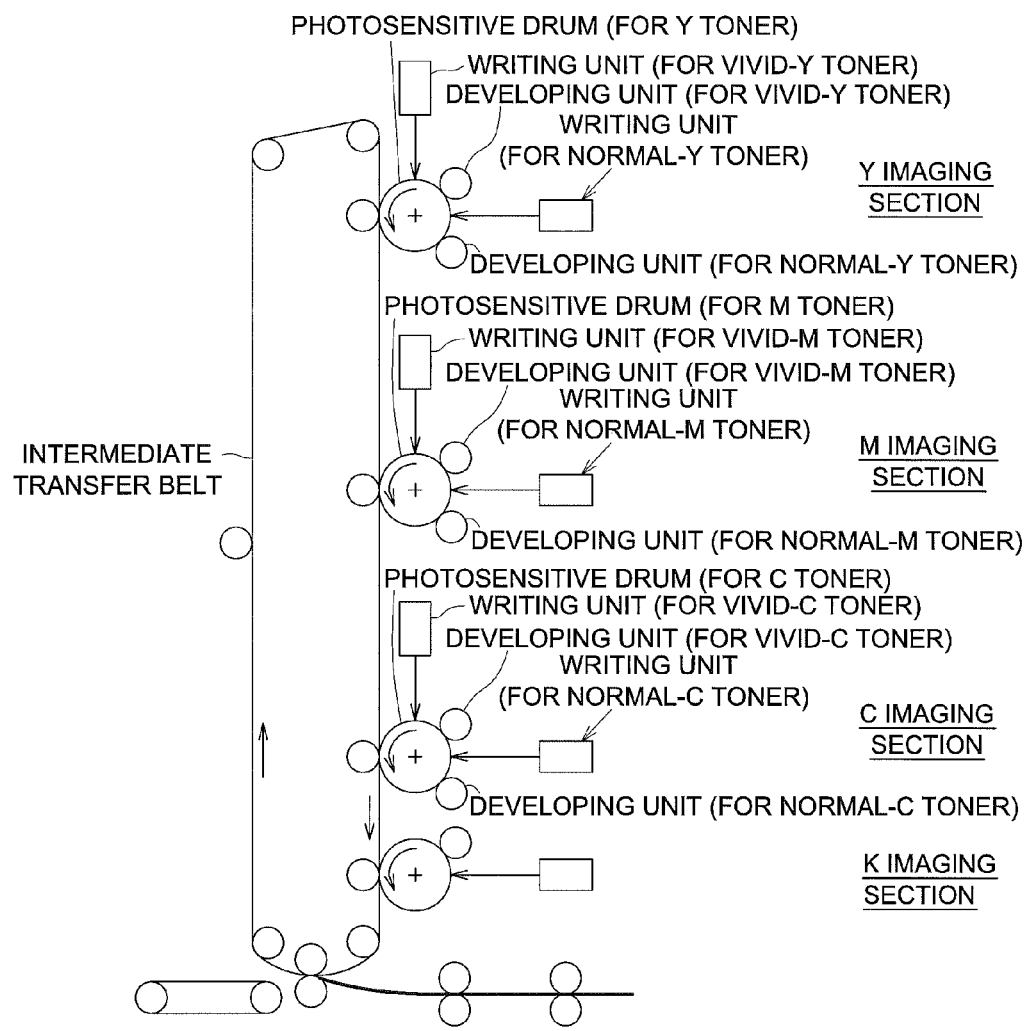
FIG. 9 is a diagram showing a configuration of a printing section, which being unitized by each color, of an image forming apparatus relating to an embodiment of the present invention.
Figure 10:
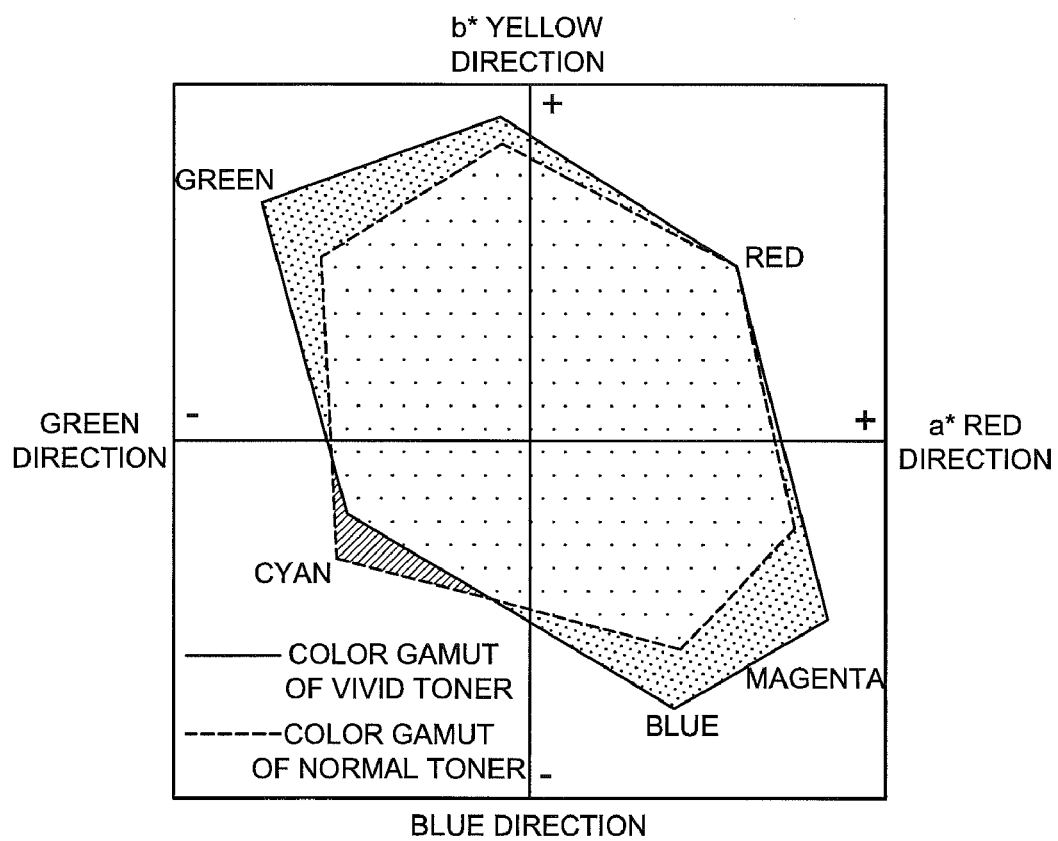
FIG. 10 is a diagram showing color reproducible range of a Vivid toner and a Normal toner.
Figures 11, 12:
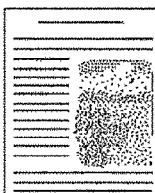
FIG. 11 is a diagram showing an example of a display screen (printer driver screen) to be displayed in a display section of a computer terminal relating to an embodiment of the present invention.
FIG. 12 is a diagram showing an example of a display screen (property screen) to be displayed in a display section of an image forming apparatus relating to an embodiment of the present invention.
Figure 13:
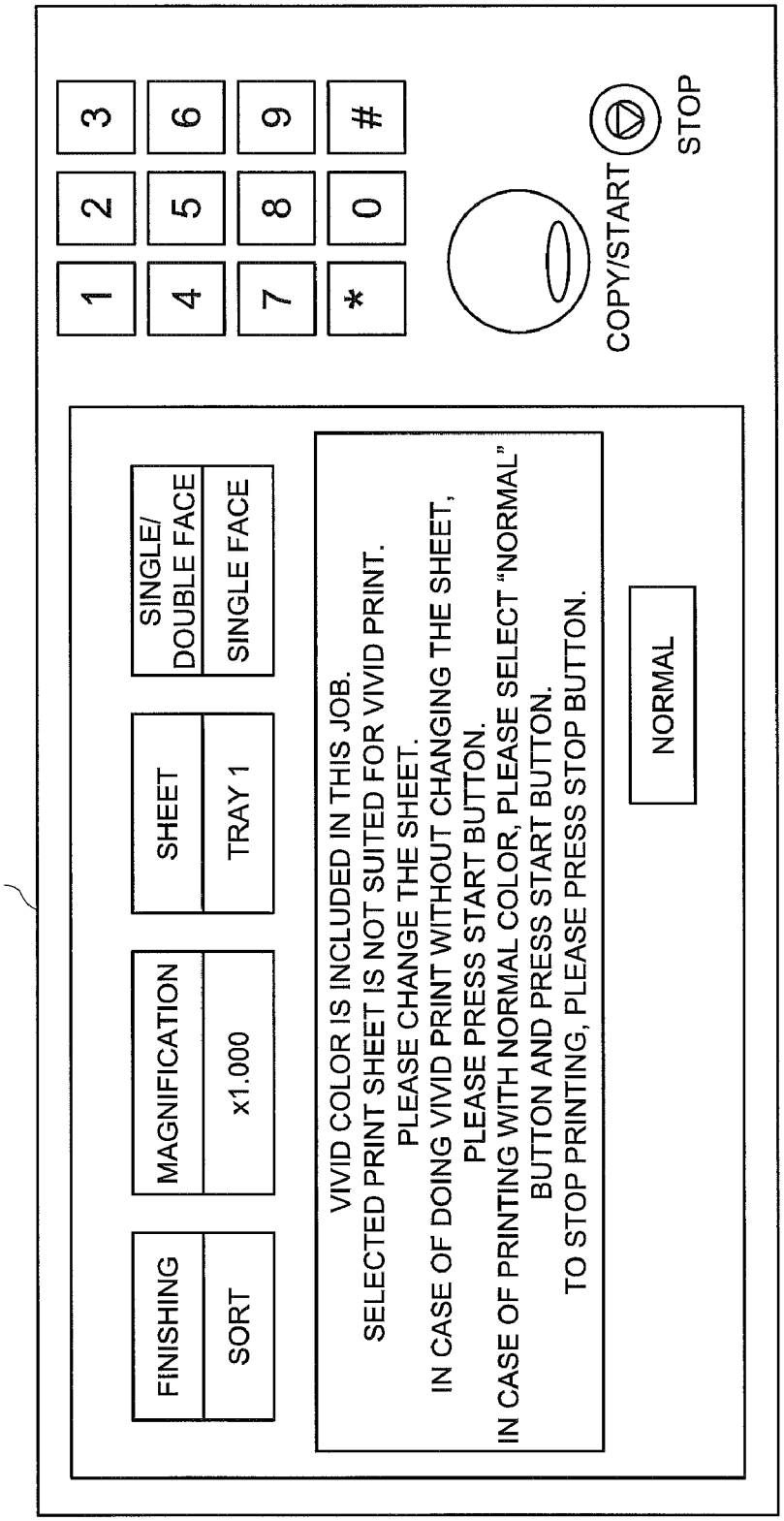
FIG. 13 is a diagram showing an example of a display screen (sheet warning screen) to be displayed in a display section of an image forming apparatus relating to an embodiment of the present invention.
Figure 14:
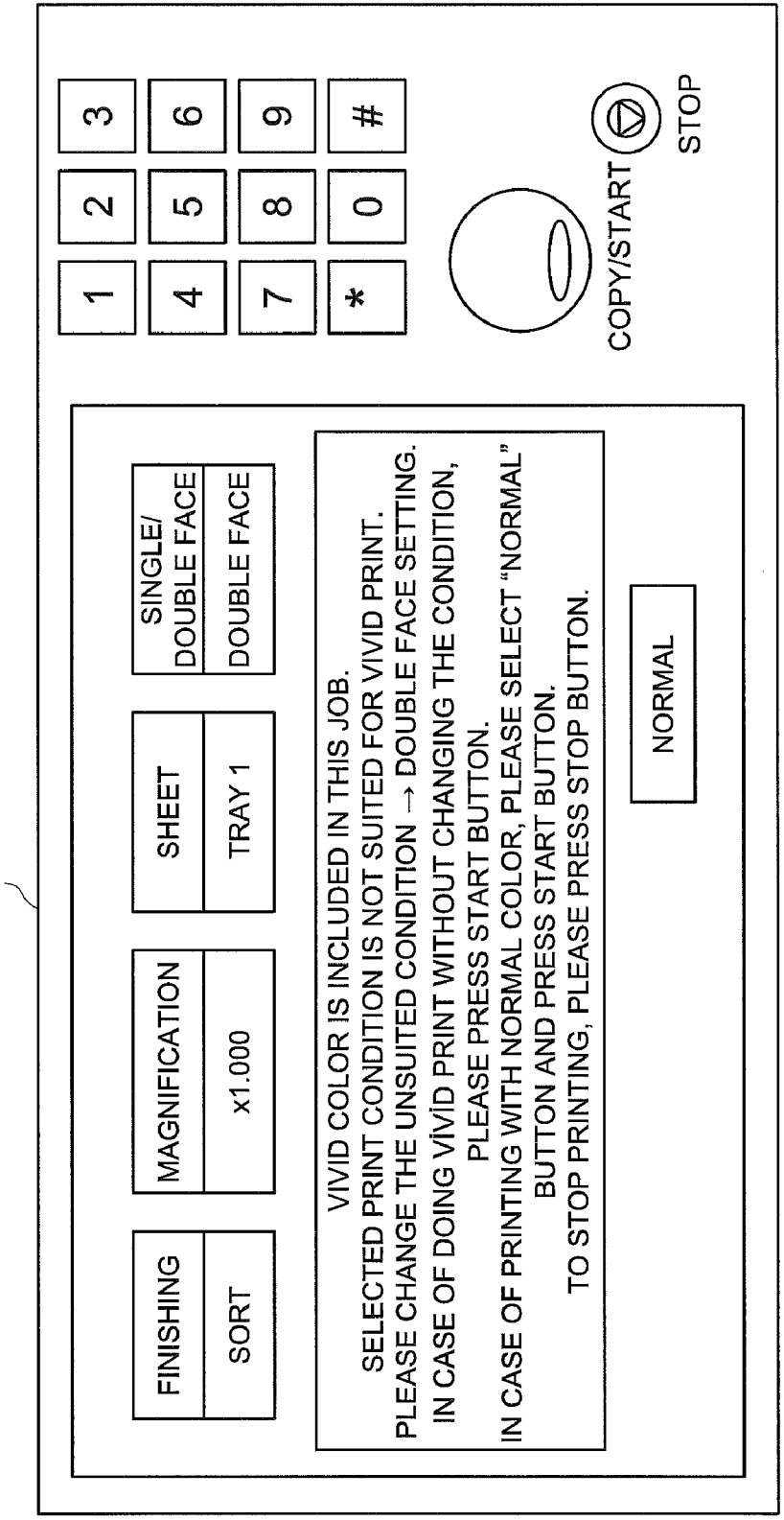
FIG. 14 is a diagram showing an example of a display screen (print condition warning screen) to be displayed in a display section of an image forming apparatus relating to an embodiment of the present invention.
Figure 15:
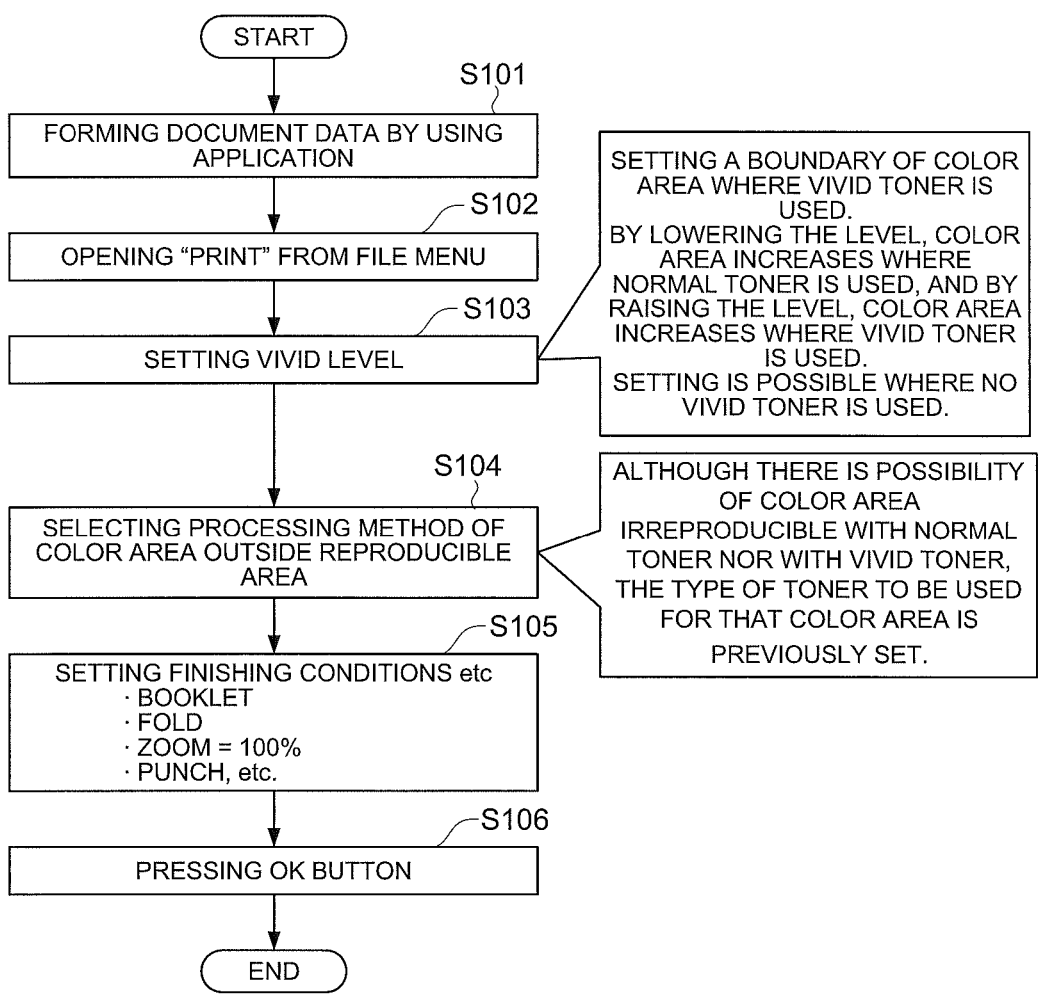
FIG. 15 is a flow chart diagram showing a procedure of a user operation at the computer terminal relating to an embodiment of the present invention.
Figure 16:
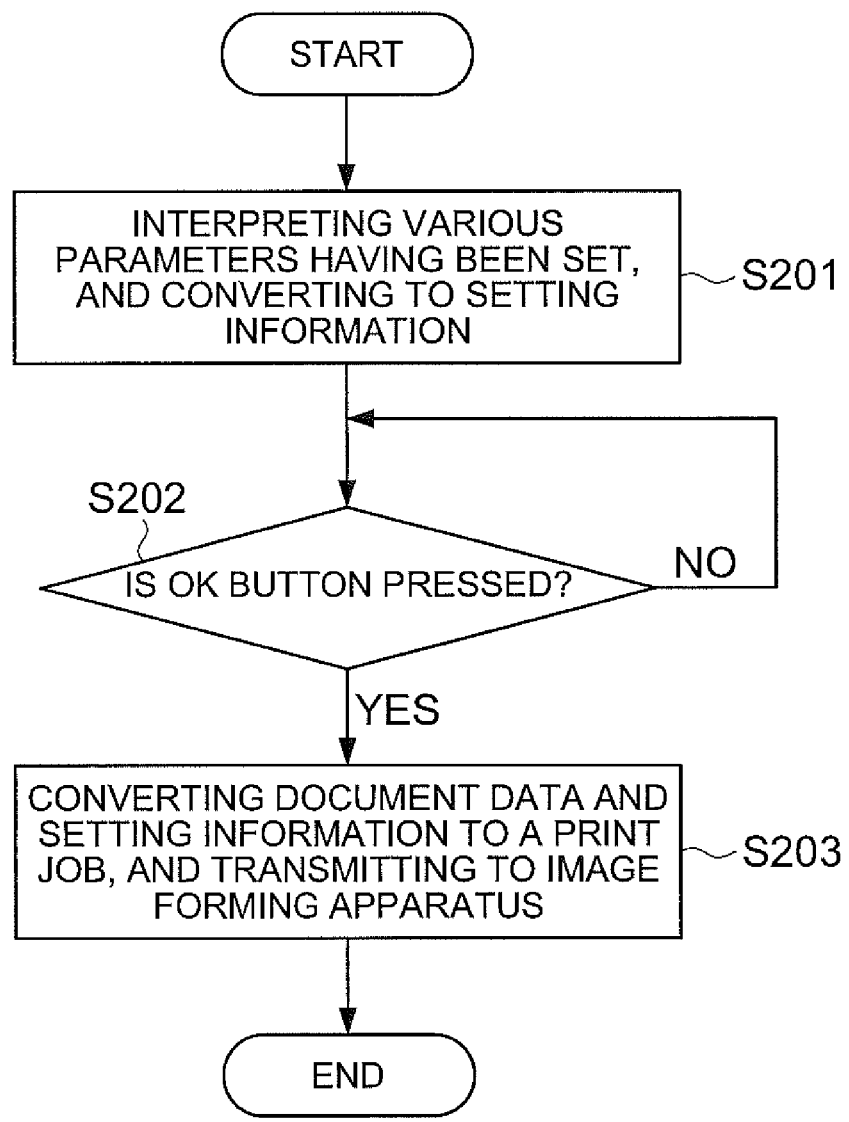
FIG. 16 is a flow chart diagram showing an operation of the printer driver at the computer terminal relating to an embodiment of the present invention.

In order to describe one embodiment of the present invention in more detail, an image forming apparatus, a printing control method, relating to the embodiment of the present invention, will be described with reference to FIGS. 1 to 23. FIG. 1 is a diagram showing a configuration example of a printing system relating to an embodiment of the present invention; FIG. 2 shows a configuration of a computer terminal; FIG. 3 and FIG. 4 show a configuration of an image forming apparatus; FIGS. 5-9 are flow chart diagrams showing configuration examples of the printing section of the image forming apparatus; FIG. 10 is a diagram showing color reproducible range of a Vivid toner and a Normal toner. FIGS. 11 and 12 are diagrams showing examples of a display screen to be displayed in a display section of a computer terminal; FIGS. 13 and 14 are diagrams showing examples of a display screen (property screen) to be displayed in a display section of an image forming apparatus; FIGS. 15 and 16 are flow chart diagrams showing procedures of a user operation at the computer terminal; FIGS. 17-22 are flow chart diagrams showing operations of the image forming apparatus; and FIG. 23 is a configuration example of a table specifying corresponding relationships among sheets, print conditions and toners.

As shown in FIG. 1, a printing system of the present embodiment is configured of one or more computer terminal 10 for transmitting and receiving a print job, and one or more image forming apparatus 20 for receiving the print job and executing the printing, and these are connected with communication network 30 of the LAN (Local Area Network) or the WAN (Wide Area Network) specified by standards such as ETHERNET (registered trade mark), Token Ring, FDDI (Fiber-Distributed Data Interface).

Further, as shown in FIG. 2, computer terminal 10 is configured of control section 11, display section 12, and operation section 13 and the like.

Control section 11 includes CPU (Central Processing Unit) 11$a$, memory 11$b$ such as ROM (Read Only Memory), RAM (Random Access Memory), HOD (Hard Disk Drive) 11$c$, and communication I/F section 11$d$ and the like, and these are connected via bus. CPU 11$a$ controls each section. Memory 11$b$ temporarily stores the various data read in from HDD 11$c$, or communication I/F section 11$d$, the stored data is processed by CPU 11$a$ and is transferred to HDD 11$c$ or communication I/F section 11$d$, as necessary. HDD 11$c$ stores the program for CPU 11$a$ to control each section, and the information relating to processable function of the apparatus and the print job, etc., which are read out as necessary and executed on memory 11$b$. Communication I/F section 11$d$ establishes the connection between the apparatuses connected via communication network 30, and executes the data transmission and reception.

Control section 11 functions as an application to create a document, and as a printer driver to print the document. The document created by the application is converted to print job with a language {PDL (Page Description Language) such as PCL (Printer Control Language) and PS (Post Script)} which is readable by image forming apparatus 20, and is transmitted to image forming apparatus via communication I/F section 11$d$.

Display section 12 is configured of a Liquid Crystal Display device (LCD), an Organic Electro Luminescence Display device, or the like, and display section 12 displays a printer driver screen and property screen for setting a print job to be sent to image forming apparatus 20.

Operation section 13 is a section for manipulating the information displayed on the display section 12, and inputting the information, and is configured of a pointing device, keyboard, trackball, track pad, tablet, stylus pen or the like.

As shown in FIGS. 3 and 4, image forming apparatus 20 is configured of control section 21, ADF (Automatic document Feeder) 22, image reading section 23, display section 24, operation section 25, sheet supply section 26, image forming section 27, post-processing section 28, and the like.

Control section 21 controls each component section, and includes CPU21$a$, memory 21$b$ such as ROM and RAM, Hdd21$c$, communication I/F section 21$d$, which being connected via a bus. CPU21$a$ controls each section. Memory 21$b$ temporarily stores various data read from HDD21$c$, image reading section 23, communication I/F section 21$d$. The temporarily stored data is applied with image processing by CPU 21$a$, and transferred to HDD 21$c$ and/or image forming section 27 as necessary. HDD21$c$ stores a program for CPU 21$a$ to control each section, information regarding the processing functions of the apparatus, data specifying color reproducible range in a prescribed color space of each toner group, a table for converting image data to the data capable of printing (hereinafter referred as print image data), an ICC (International Color Consortium) profile described below, information regarding the sheets loaded in each sheet tray of sheet feeding section 26, and a table specifying the correlation of the sheet and printing conditions between toners, etc. The data stored in HDD 21$c$ is read out by CPU 21$a$ as necessary, and executed on memory 21$b$. Communication I/F section 21$d$ executes transmission and reception of data, by establishing the connection between devices connected via communication network 30.

Control section 21 also functions as a image processing section which creates image data by rasterizing each page of a print job, applies with image processing and screening as necessary, and after that, converts to the print image data capable of printing at image forming section 27.

Further, control section 21, in addition to controlling each part of printing section 27, converts bitmap data of each page into values in a prescribed color space by prescribed unit (for example, with a Bit unit), and by determining where the data of the color space belongs in the areas of color gamut of the first toner group (for example, Normal toners) or color reproducible range of the second toner group (higher chroma toners than the Normal toners, for example, Vivid toners), judges whether the color of the second toner group is included in the image of the print subject (namely, judges the proper toner group for the image). Further, based on the properties of the sheet (glossiness, whiteness or thickness, etc.) designated by the print job or printing conditions (the type of single side or double sides, single sheet/plural sheets, etc.) the control section 21 judges whether properties of the second toner group can be effectively utilized or not, and controls to execute printing by determining the toner group to be utilized based on the judgment. Said control section can be structured as hardware, or structured such that control section 21 executes the printing control program which is configured to allow a computer to function as the printing control section.

ADF 22 is a section which automatically conveys a single or plural sheet of original documents to image reading section 23.

Image reading section 23 is for optically reading the image data from a document sheet on a platen, and is configured of a light source to scan the original, an image sensor such as CCD (Charge coupled Device) to convert the light reflected from the original to electrical signals, and an A/D converter to apply A/D conversion on the electrical signals, etc.

Display section 24 is configured of a LCD display device, an organic EL display device, or the like, and displays a screen for operating image forming apparatus 20 and a screen for displaying the color difference, etc. Operation section 25 is configured of such as buttons and switches for various setting and instructions. Display section 24 and operation section 25 may be either separate devices or a single bodied device where a pressure sensitive operation section 25 (touch panel) having transparent grid electrodes is provided on display section 24. In the case of touch panel, XY coordinates of the position pressed by a finger or a stylus is detected as voltage values, and the detected positional signal is outputted as an operation signal onto control section 21.

Sheet supply section 26 is configured of sheet trays accommodating various sized sheets of paper, and includes a section to convey the accommodated sheets to image forming section 27. A configuration is possible where properties (glossiness, whiteness, thickness, etc.) of the sheet accommodated in each sheet tray are previously stored in HDD 21, etc., and another configuration is also possible where a device for detecting the properties of sheet (a sensor for measuring the reflected light intensity or spectrum, and/or for measuring the loaded amount of the sheets in the sheet tray is provided in each sheet tray), and the result of measurement is sent to control section 21, and control section 21 analyses the information to obtain the properties of the sheets (glossiness, whiteness, and thickness, etc.).

Printing section 27 is configured of component elements necessary for an image forming process utilizing such as an electrophotographic system or an electrostatic recording system. Printing section 27 forms an image on a specified sheet based on the image data read from image reading section 23 or the print job received via communication I/F section 21*d*, and send out to post-processing section 28. Details of the printing section 27 will be described later.

Post-processing section 28 applies finishing processing required by a user, to the sheet conveyed from image forming section 27, such as punching, stapling, and book binding based on the instruction from control section 21.

The configurations shown by FIGS. 1-4 are examples of the present embodiment, and are properly changeable. For example, in a case where image forming apparatus 20 is used for a printer, ADF 22 or image reading section 23 may be omitted, and in a case where the post processing is not required, post-processing section 28 may be omitted.

Further, in FIG. 1, although the printing system is configured of computer terminal 10 and image forming apparatus 20, a control device such as a RIP (Raster Image Processor) controller to convert the image data into the print image data may be connected via communication network 30. In that case, the control section may functions as a printing control section (to execute a printing control program).

Next, as specific configuration of printing section will be described.

Figure 5:
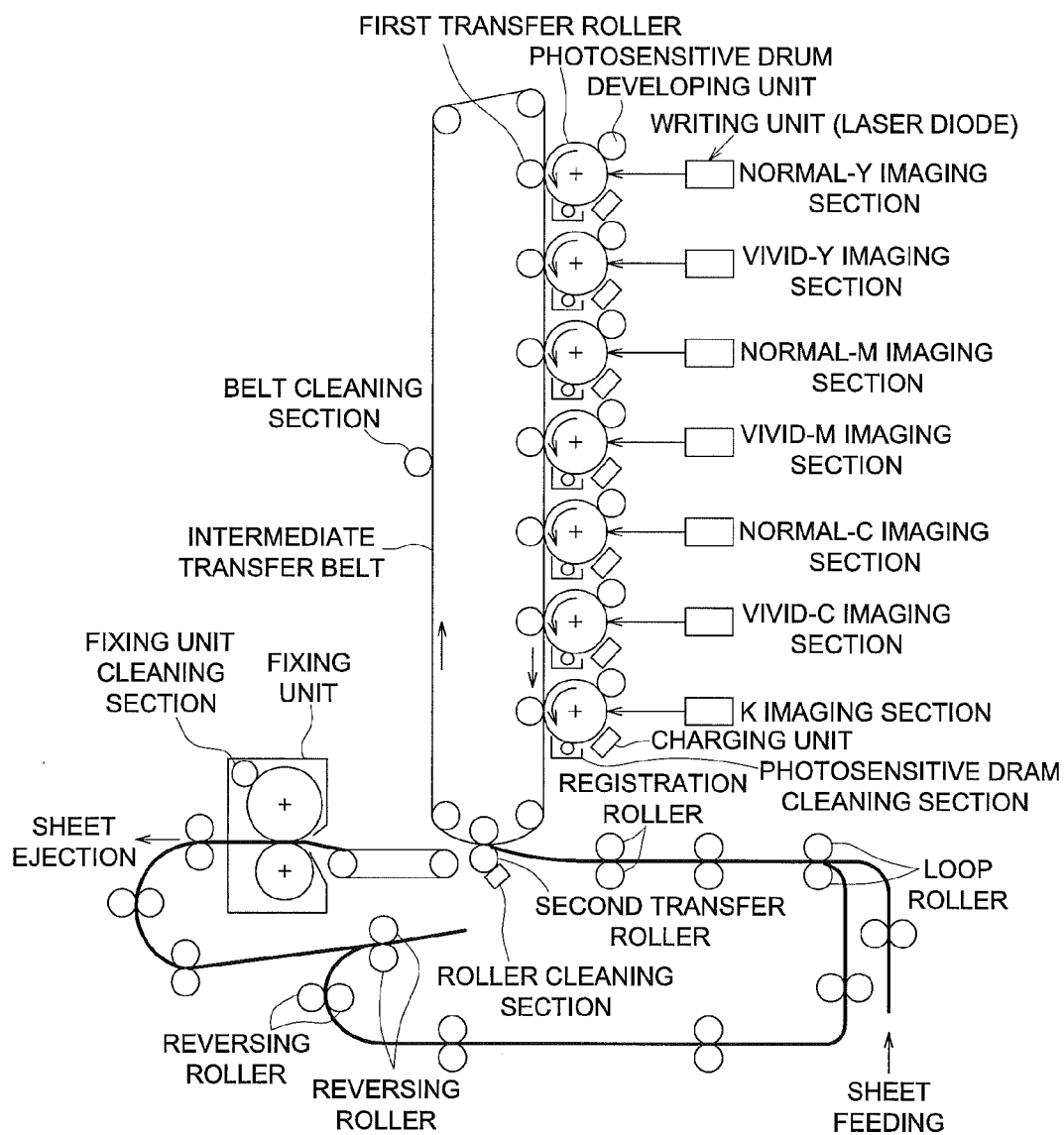
FIG. 5 is a diagram showing a specific configuration of a printing section of an image forming apparatus relating to an embodiment of the present invention;
resent invention.

As shown in FIG. 5, printing section 27 is configured of a writing unit, a photoconductor unit, a transfer unit and the like. The writing unit is composed of such as a laser diode, and irradiates the laser beam to expose an image based on the bitmap data inputted from the image processing section. The photoconductor unit is configured of a photoconductor drum, a developing unit, a charging unit, a photoconductor cleaning section, and the like, and forms a toner image on the photoconductor drum with a toner supplied from the developing unit. In the present embodiment, printing section 27 is provided with seven photoconductor units and writing units corresponding to seven colored toners including yellow (Y), magenta (M), and cyan (C) toners in a first toner group (Normal toner in this group), and yellow (Y), magenta (M), cyan (C), and black (B) toners in a second toner group (Vivid toner group) having higher chroma than the first toner group. Drives or pauses of those units are independently controlled by the printing control section (printing control program). The transfer unit is configured of a first transfer roller, an intermediate transfer belt, a belt cleaning section, a second transfer roller, a roller cleaning section and the like, and transfers the toner image formed by the photoconductor unit onto the intermediate transfer belt, then transfers the toner image on the intermediate transfer belt onto a sheet of paper.

The fixing unit is configured of a fixing device, a fixing unit cleaning device and the like, and fixes the toner image on the sheet of paper. The conveyance unit is configured of a sheet supply roller, a registration roller, a loop roller, a reversing roller, a sheet ejection roller and the like, and conveys a prescribed sheet from sheet feeding section 26 to the second transfer roller, then ejects the sheet after fixing to post-processing section 28.

FIG. 4 shows a basic configuration of printing section 27, however the configuration where seven photoconductor units corresponding to total seven colors of three CMY Normal toners, three CMY Vivid toners and one K toner are always contacting the intermediate transfer belt has a problem as below. For example, in a case where image formation being executed by the use of four toners of Normal CMY three toners and K toner, if the photoconductor units for the unused Vivid toners are driven, problems will occur that the life of Vivid toner is shortened, or that the Vivid toner remained on the photosensitive drum is attached onto the intermediate belt. On the other hand, in a case where the image formation is executed by the use of only four colors including three of CMY Vivid toners and K toner, if the photosensitive drum unit for the unnecessary Normal toners are driven, the life of the Normal toners will be shortened, or the problem will occur that the Normal toner remained on the photosensitive drum will be attached onto the intermediate belt.

Figure 6:
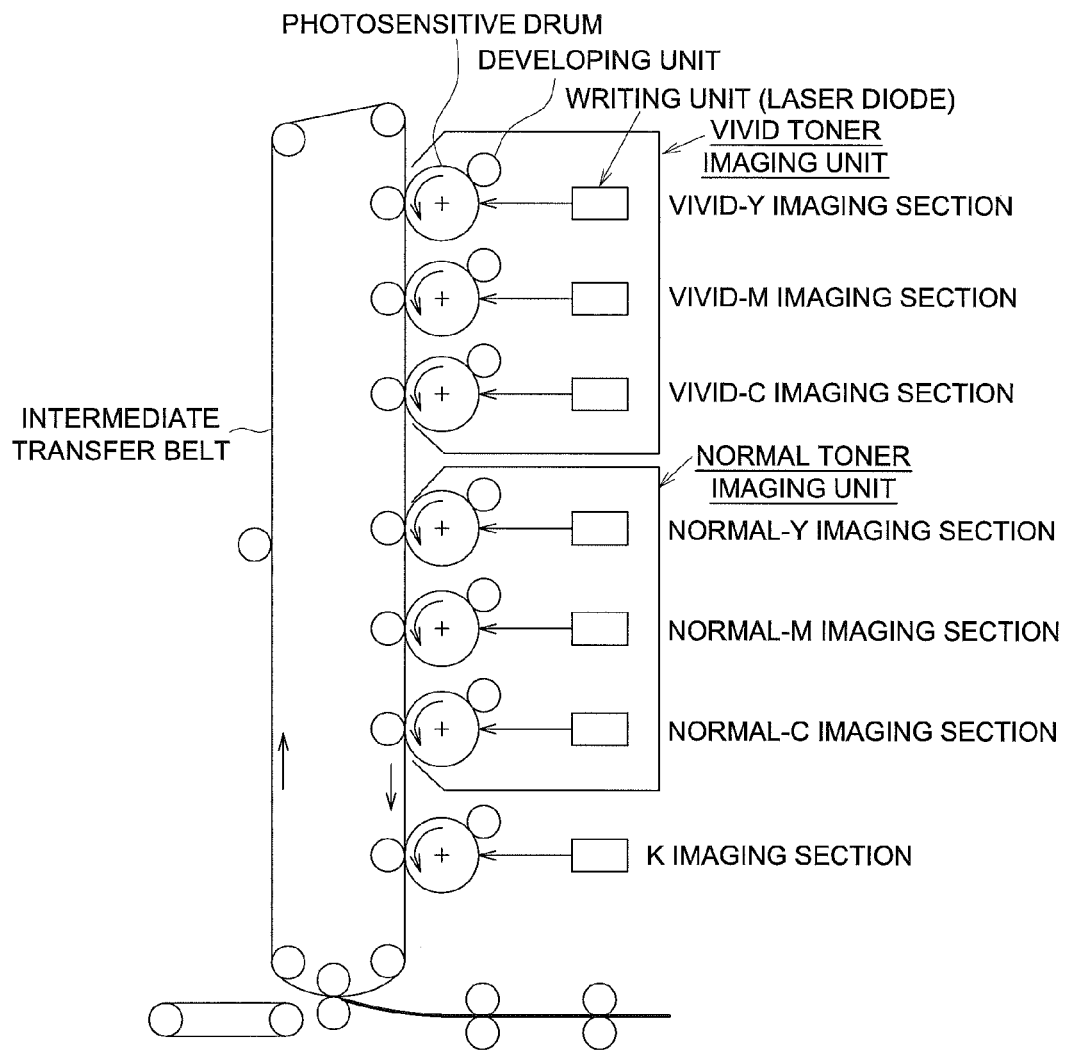
FIG. 6 is a diagram showing a specific configuration of a printing section, which being unitized by each toner group, of an image forming apparatus relating to an embodiment of the present invention.

Against these problems, as shown in FIG. 6 illustrating the main part of printing section 27, imaging sections (writing units and photosensitive drum units) for normal YMC toners are configured to be a Normal toner imaging unit, imaging sections (writing units and photosensitive drum units) for Vivid YMC toners are configured to be a Vivid toner imaging unit, and each of the imaging units is connected to a means for mechanically dislocating said imaging unit (specific structure of the means is not required). Thus, by the control of printing control section (printing control program), each imaging unit can be independently come into contact or set aside from the intermediate transfer belt. Further, by making each imaging unit electrically controllable, each imaging unit can be independently driven or put in a pause by the control of printing control section (printing control program).

Figure 7:
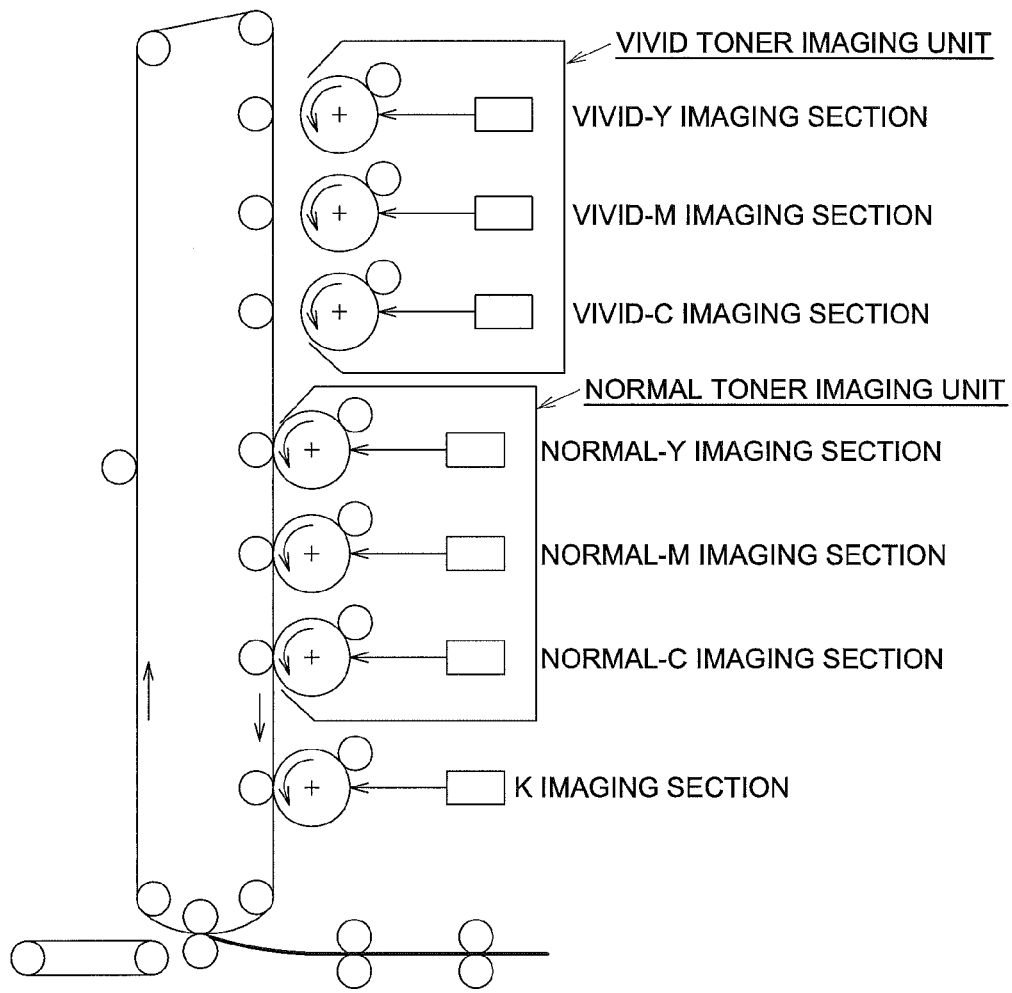
FIG. 7 is a diagram showing a status of a printing section, where a Vivid toner imaging unit is retracted, of an image forming apparatus relating to an embodiment of the present invention.

For example, in a case of print data having only a color reproducible range which can be printed only with Normal toners, the Vivid toner imaging unit is set aside or put into a pause as shown in FIG. 7, thus the consumption of the nonuse Vivid toners is suppressed and adhesion of the Vivid toner is prevented. On the other hand, in a case of print data having only a color reproducible range which can be printed only with Vivid toners, the Normal toner imaging unit is set aside or put into a pause as shown in FIG. 8, thus the consumption of the nonuse Normal toners is suppressed and adhesion of the Normal toner is prevented.

In these cases since the K toner in K imaging section is commonly used with the Normal toners and the Vivid toners, K imaging section constantly contacts to the intermediate transfer belt. In case of unitizing each of Vivid toner imaging sections and Normal toner imaging sections, if one imaging unit is put in pause for a long period, problems such as solidification of toner may be caused, therefore, such the control as to periodically drive the nonuse imaging unit or to drive both imaging units for a certain period upon power input is preferable.

Further, in cases of multi color printers, generally images are once formed on the intermediate transfer belt by the use of all color toners, after that the images are transferred to a printing sheet. Therefore, as shown in FIG. 9 illustrating the main part of printing section 27, one photosensitive drum is provided for each color of CMY, for each photosensitive drum arranged are developing units for Normal toner and Vivid toner and writing units for Normal toner and Vivid toner, and by the control of printing control section (printing control program) each developing unit and writing unit is capable to be independently driven or put in pause. According to this configuration, the sizes of printing section 27 can reduced and downsizing of image forming apparatus 20 can be realized.

In FIGS. 5-9, the cases are shown where seven color toners are used including three colors of Normal toners, three colors of Vivid toners and K toner, eight colors of toners may be used including four colors of normal CMYK toners and four colors of Vivid CMYK toners.

Next properties of normal and Vivid toners to be used in the present embodiment will be described. In FIG. 10, color reproducible ranges of Normal toner and Vivid toner are shown in a expression method generally called as Gamut (Gamut: color range reproducible by peripheral devices such as printers or monitors), and FIG. 10 is a image of color space solid expressed with Lab values (L-axis=lightness, a-axis=green to red, and b-axis=blue to yellow) seen from above.

From FIG. 10, it can be seen that the reproducible range of Vivid toners (the range enclosed by solid lines) is wider than that of Normal toners (the range enclosed by dotted lines) with respect to Blue, Magenta, Red and Green. With respect to Cyan, the reproducible range of Normal toners is wider than that of Vivid toners. Further, the hatched area with coarse dots indicates a color region reproducible either by the Normal toner or Vivid toner, the hatched area with fine dots indicates a color region reproducible by only Vivid toners, and the hatched area with diagonal lines indicates a color region where reproducible by only Normal toners.

In the present embodiment, a plurality of types of toner group may be combinations of toner groups at least a part of whose reproducible ranges is overlapped, and the color reproducible range is not specifically limited. For example, in FIG. 10, a combination of toner groups where each toner group has a region reproducible only by said toner group is exemplified, however, another combination is possible where the reproducible range of one toner group includes that of the other toner group. Further, in the present embodiment the color space managed by Lab is utilized, however arbitral color spaces managed by device independent colors independent from devices such as CIE and XYZ may be also utilized.

Procedures for executing printing by the use of the printing system of above configuration will be described below.

First, the user's operation for computer terminal 10 of the present embodiment will be explained referring to the flow chart of FIG. 15, and screen examples of FIGS. 11 and 12.

<User's Operation>

Control section 11 of computer terminal 10 activates the application, and by using the application the user forms a document data whose required color is specified (S101).

Next, when the user indicates printing by using such as a file menu of the application (S102), control section 11 activates a printer driver to display printer driver screen 40 on display section 12 as shown in FIG. 11. In this printer driver screen 40, columns for setting such as a printer, print range, print set number, print object, specified print, enlargement/reduction, etc. are arranged. The user set each items by operating operation section 13. Then, when a property button is pressed, control section 11 displays property screen 41 on display section 12 as shown in FIG. 12.

On this property screen 41, provided is a column to set the use conditions of Vivid toner, and the user operates operation section 13 to set the Vivid level as necessary (S103). For example, in order to emphasize the Vivid degree, the user may set the Vivid level toward plus direction, and more image area (bit) will be printed with Vivid toners. In order to reduce the cost by suppressing the degree of Vivid, the user may set the Vivid level toward minus direction, and less image area (bit) will be printed with Vivid toners. Further, in the case of emphasizing the cost, the user may select "nonuse of Vivid toner", and the printing will be executed only with the Normal toners without using the Vivid toners.

Further, on the property screen 41, provided is a column for specifying the processing to the color outside the reproducible range, and the user selects the processing for the color area outside the reproducible range (S104). For example in a case where a color region which cannot be reproduced by the Normal toners or the Vivid toners is included, the user sets whether to use the Vivid toners (Vivid output) or Normal toners (Normal output) for that irreproducible color region.

Further, on the property screen 41, provided is a column for specifying the detailed items regarding the printing, and the user operates the operation section 13 to select, for example, original document size, output size, type of print sheet, printing conditions (single side/double side booklet, etc.), finishing (staple, punch), etc.

After setting the Vivid level, selecting the processing of color area outside the reproducible range, and setting the detailed printing conditions, the user presses OK button on property screen 41 (106).

Next, by referring to the flow chart of FIG. 16, the processing of printer driver in computer terminal 10 in the present embodiment will be described.

<Processing of Printer Driver>

First, the printer driver interprets various parameters having been set on property screen 41, and converts to setting information describable on a print job (S201).

Next, the printer driver monitors whether OK button in printer driver screen 40 is pressed (S202).

When OK button is pressed, the print driver converts the converted various setting information and the document data formed by the application into a print job of PDL, and transmits the print job to image forming apparatus 20 (S203). Wherein, in the print job to be transmitted to image forming apparatus, the color range (gamut) information is included.

Figure 17:
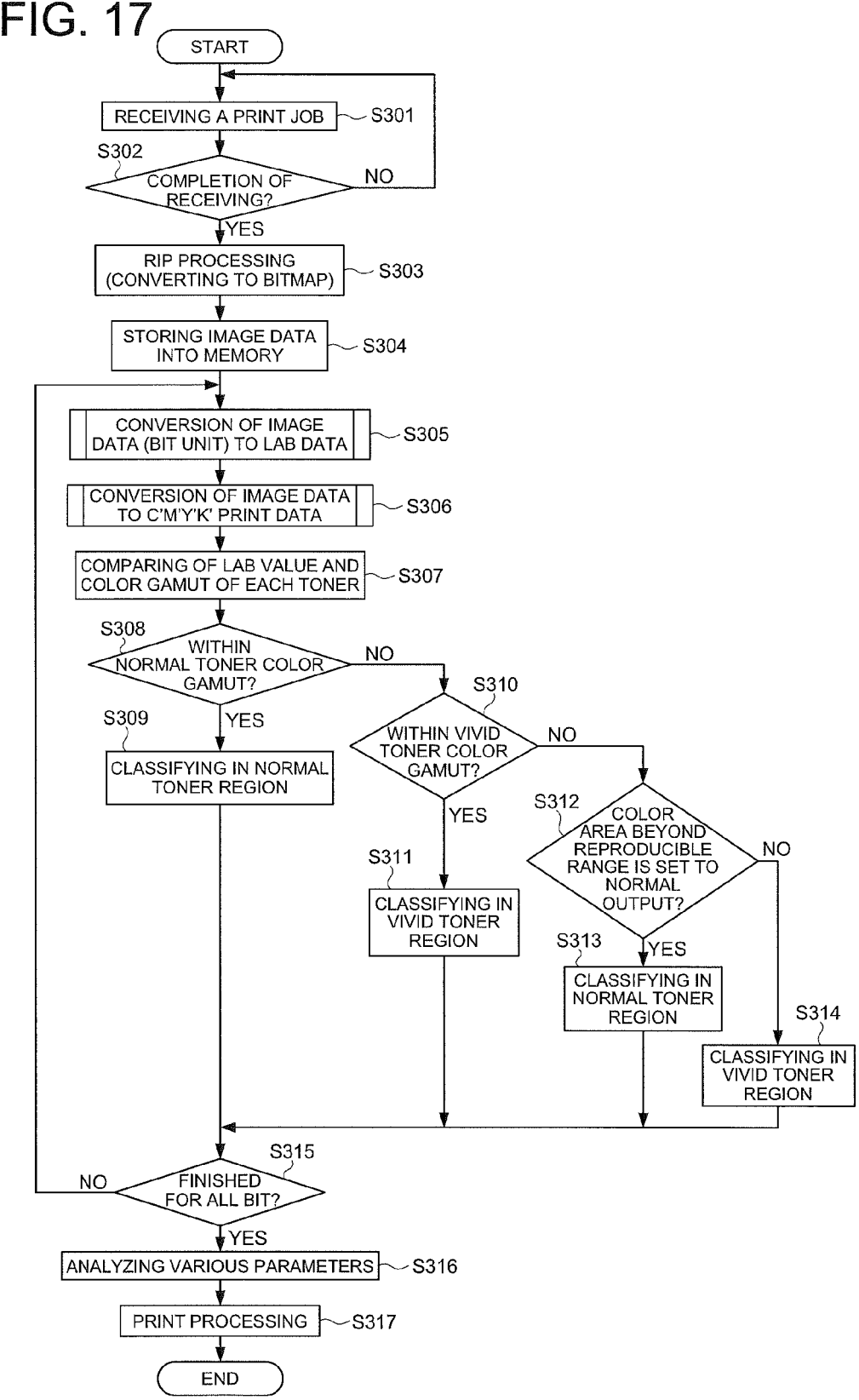
FIG. 17 is a flow chart diagram showing a total operation of the image forming apparatus relating to an embodiment of the present invention.
Figure 18:
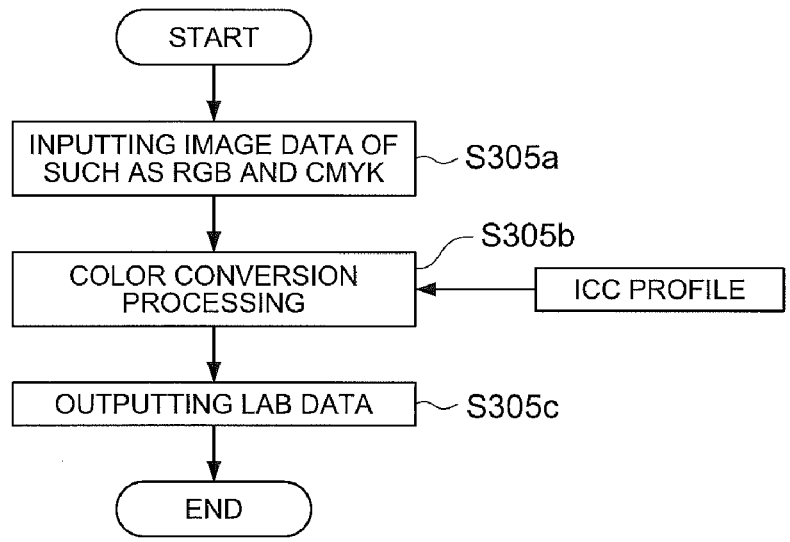
FIG. 18 is a flow chart diagram showing a procedure of conversion to Lab data in the image forming apparatus relating to an embodiment of the present invention.
Figure 19:
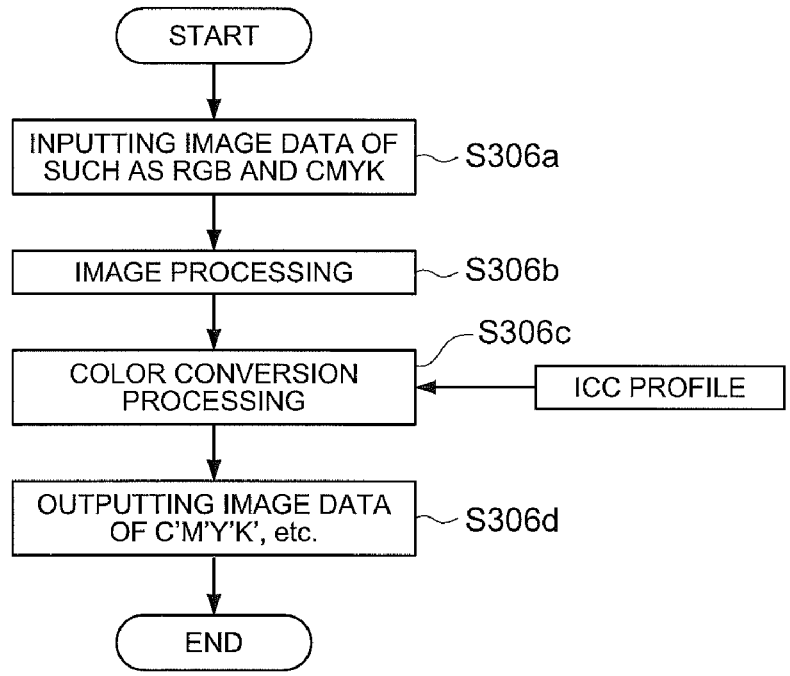
FIG. 19 is a flow chart diagram showing a procedure of conversion to CMYK print data in the image forming apparatus relating to an embodiment of the present invention.

Next, regarding the operation of image forming apparatus 20 of the present embodiment will be described by referring to the flow charts of FIGS. 17-19. In memory 21b or HDD21C of image forming apparatus 20, previously stored are data for specifying the color reproducible range, in prescribed color space, of the first toner group (Normal toners, in this case), and the second toners (Vivid toner in this case), and ICC profile (the device profile describing the characteristics of each device regarding colors).

Control section 21 of image forming apparatus 20 receives the print job sent from the printer driver (S301), and upon completion of the reception (S302: Yes), by rasterizing the data for each page of print job, converts to such as the image data of bitmap format which being a data format printable by printing section 27 (S303), and stores the converted data in memory 21b or HDD 21c (S304).

Next, control section 21 (print control program) converts the stored image data to Lab data by Bit unit (namely, converts the color information in each pixel of the image based on the image data into Lab values) by the use of ICC profile (S305). Specifically, as shown in FIG. 18, by inputting the image data such as RGB and CMYK (S305a), converts the device dependent color of such as ROB or CMYK into device independent color such as Lab by using ICC profile (S305B), and outputs the Lab data (S305c).

Next, control section 21 (control program) converts the same image data by Bit unit to print data for using each toner group (S306) by the use of ICC profile (S306). Specifically, as shown in FIG. 19, by inputting the image data such as RGB and CMYK (S306a), after executing a prescribed image processing (S306b), and executing a color conversion processing by using ICC profile (S306c), outputs the print data such as C'M'Y'K' (S306d).

Next control section 21 (control program) reads out the data specifying the color reproducible range of Normal toners and Vivid toners from memory 21b or HDD21c, and compares the Lab data values converted at S305 with color reproducible range of Normal toner and Vivid toner (S307).

And, control section 21 (control program) judges whether the Lab values are within the Normal toner color reproducible range (S308), if within the color reproducible range of Normal toner (region hatched with coarse dots or region hatched with diagonal lines in FIG. 10), classified the bit of the image data into a region where the Normal toners are used (S309).

Next, control section 21 (control program) judges whether the Lab values are within the Vivid toner color reproducible range (S310), if the Lab values are outside the reproducible range of Normal toners and within the color reproducible range of Vivid toners (region hatched with fine dots in FIG. 10), classifies the bit of the image data into a region where the Vivid toners are used (S311).

Next, control section 21 (control program) reads out the setting of processing for color area beyond the reproducible color region in property screen 41 of FIG. 12, from the print job. And, if the normal output has been set (S312: Yes), the control section classifies the bit of the image data into a region where the Normal toners are used (S313), and if the Vivid output has been set (S312: No), classifies the bit of the image data into a region where the Vivid toners are used (S314).

Next, control section 21 (control program) judges whether the processing for all bit of the image data has been completed (S315), and if the processing is not completed, repeats the sillier process by returning to step S305. Each bit data classified into the region for using the Normal toners or the region for using the Vivid toners has each CMYK values of Normal toner and CMY values of Vivid toner, thus the toner amount for normal CMYK toners and the toner amount for Vivid CMY toners are set for all Bit of the image.

Next, control section 21 (control program) analyzes various parameters specified by the print job, and based on the set values, sends as the print data for each color drum to printing section 27 (step S316).

After that, printing section 27 executes the print processing (step S317). At that time, in printing section 27 having the configuration shown in FIGS. 5-9, it is preferable that the control section controls, in the case of using only one toner group, to stop the movement of the imaging sections (the developing unit and the writing unit in the case of FIG. 9) corresponding to the other toner group. Further, in printing section 27 having the configuration of FIG. 6, the control section (print control program) preferably controls to set aside the Vivid toner imaging unit as shown in FIG. 7 in the case of using the Normal toners, and controls to set aside the Normal toner imaging unit as shown in FIG. 8 in the case of using the Vivid toners.

In the above flow, by assuming that the Vivid level is set to 0 in the Vivid level setting column in FIG. 12, when the Lab values are within the Normal toner color reproducible range, the pixel of the image is classified into the region to use the Normal toner regardless of within or outside the Vivid toner color reproducible range. And when the Lab values are outside the Normal toner color reproducible range and within the Vivid toner color reproducible range, the pixel of the image is classified into the region to use the Vivid toner. However, in cases where the Vivid level is set to plus or minus level, the criteria of determination will be changed.

For example, in cases where "Vivid level+1=10%" is previously set, the value obtained by weighing the Lab value (adding 10%, in this case) is used for the criteria of determination. Namely, up to 10% added color area compared to normal state is classified into the color region to use the Vivid toner. As a matter of course, the value of 10% may be changed to other values, and the numerical value may be simply increased or decreased instead of %.

With respect to the boundary area between the Normal toner color reproducible range and the Vivid toner color reproducible range, basically the region is strictly divided to each color reproducible range, however the boundary may be shifted to the side of Normal toner color reproducible range or to the Vivid toner color reproducible range. By doing this, the reproduction reflecting user's preference can be realized such as cost reduced or Vivid toner emphasized image reproduction. On this occasion, the shifting range may be properly set, and the mode of not using the Vivid toner may be also set.

In the above flow, image data are classified by bit unit into the Normal toner region or the Vivid toner region, the image data may be classified by a prescribed unit such as multiple bits (in other words, a prescribed image area unit such as multiple pixels) into the Normal toner region or the Vivid toner region. In this case, the average values of Lab is obtained by the prescribed unit, or the average values of RGB values in the prescribed unit may be converted to the Lab values.

In the above columns, described is the method of selecting the toner groups based on the image data. As described above, even in cases where the Vivid toner is selected based on the result of comparison between the Lab values obtained from the image data and the color reproducible range of Normal toner or the Vivid toner, there may be cases where the properties of the Vivid toner are not exploited depending on the recording sheet type or printing conditions.

For example, in order to effectively exploit the properties of the Vivid toners, it is preferable to use the recording sheet having high whiteness, and smooth surface. The most preferable sheet is generally called as a coated paper which is applied a coating with pigments, etc., on the high-quality paper surface. Since this paper has high whiteness, and smooth surface with high reflection rate, the properties of Vivid toners are effectively exploited by this paper. In contrast, by the paper with low whiteness and rough surface, for example recycled paper or colored paper, etc., the properties of Vivid toners are not effectively exploited, and desired printing result cannot be obtained even by using the Vivid toners.

Further, regarding the thin paper, in the case of single sheet output the properties of the Vivid toner may be exploited, however in the case of multiple sheets output, since the image on the next page can be seen through, the properties of the Vivid toner cannot be exploited. Further, in the case of double sided printing, if the paper thin enough to see through the image printed on the back side is used, the whiteness and uniformity of the paper are reduced by the influence of the back side printing, thus the properties of the Vivid toner cannot be exploited. Further, in the case of special printing such as watermark printing, since images are required to be thinly printed, the properties of the Vivid toner cannot be exploited. On the other hand in the case of using the thick and high whiteness paper, through which the back side printed image cannot be seen, even when the double sides printing is executed, the properties of the Vivid toner is effectively exploited, since the images on the backside cannot be seen through.

Control section 21 (printing control program) specifies the sheet type and printing conditions, and refers to the table, which describes relationship of the sheet type and printing conditions with the suitable toner group suitable for those conditions, and as shown in FIG. 23, the table being previously stored in HDD21c, etc. Thus the control section judges whether the properties of the Vivid toner can be effectively exploited by said sheet type and printing conditions.

For example, if the specified recording sheet is such as a coated paper, or a thick paper with high whiteness, Vivid toners are simply used for printing, however if a recycled paper or a colored paper is specified, the Normal toners are used for printing without using the Vivid toners. Further, in cases where the selected sheet is a recycled paper or a colored paper which is prohibited from printing with the Vivid toner, or the set printing conditions is the condition, which is prohibited from printing with the Vivid toner, such as double sided printing or the watermark printing, the printing procedure is temporarily stopped, and display section 24 displays to the effect that the recording sheet or the printing conditions not suited for the Vivid toner printing having been set, to require user's determination.

In the case of requiring the user's determination, the determination may be mandatory printing using Vivid toners with the selected sheet and printing conditions, or may be printing with Normal toners. Further it may be possible to execute the Vivid toner printing by changing the sheet and conditions to those suitable for Vivid toner printing.

The above-described control will be specifically described by referring to the drawings. The control described below is the one executed on the steps S316 and S317 in the flow chart shown in FIG. 17.

Figure 20:
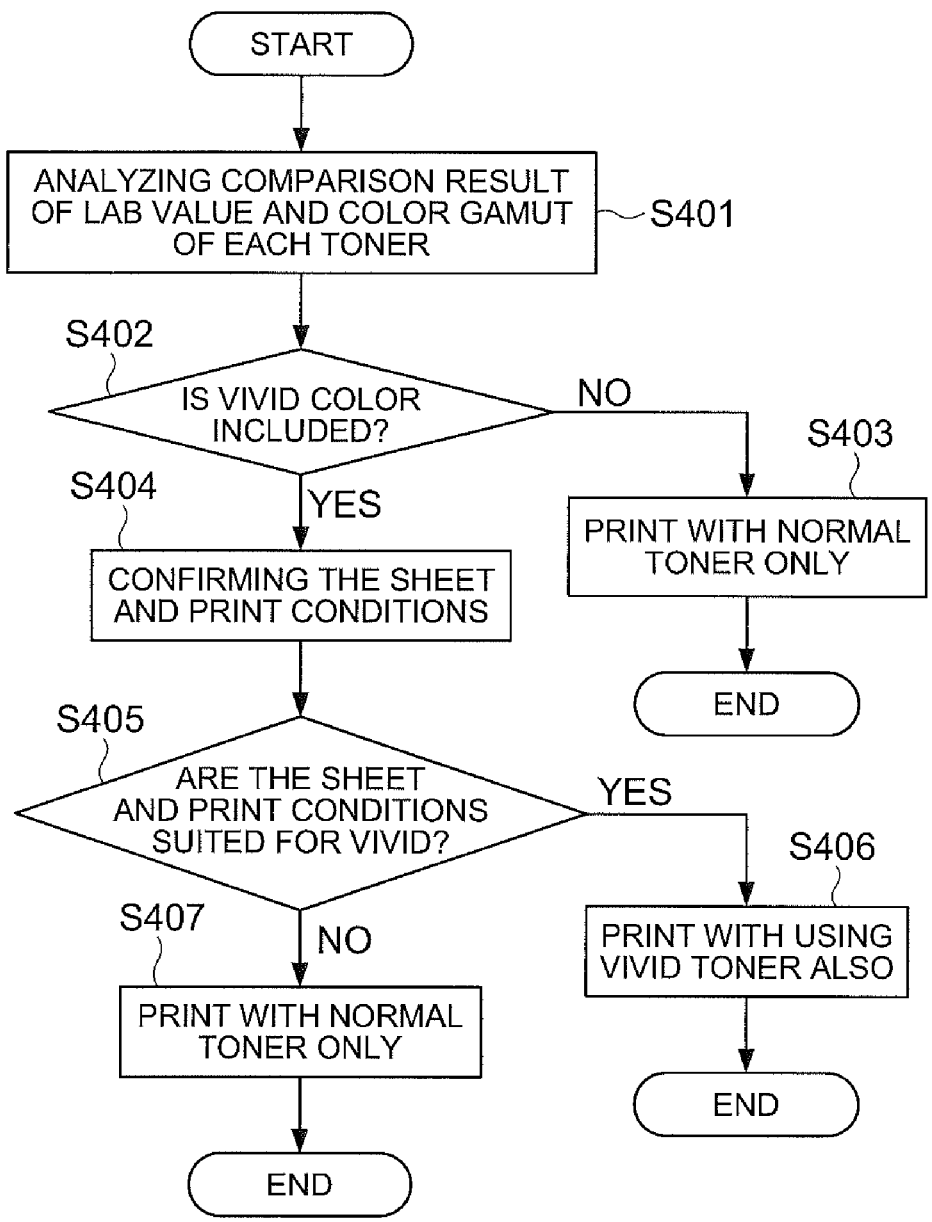
FIG. 20 is a flow chart diagram showing a procedure of printing control in the image forming apparatus relating to an embodiment of the present invention.

Firstly, the processing of automatically selecting the toner based on the recording sheet and printing conditions is described with referring to the flow chart of FIG. 20 and the table of FIG. 23.

Control section 21 (printing control program) analyzes the comparison result of Lab values and color reproducible range (color gamut) of each toner group (S401), and judges whether or not the Vivid color is included in the image of printing object (S402). If the Vivid color is not included, printing is executed by only using the Normal toners (S403).

On the other hand, in the case of including the Vivid color, control section 21 (printing control program) analyzes print job to confirm the recording sheet and print conditions having been set (S404), and judges whether the sheet and printing conditions are suited for the Vivid toners (S405).

Specifically the control section specifies the designated sheet type and printing conditions (single/double sides, shingle sheet/multiple sheet configuration, special printing or not, etc.), and judges the toner correlated to the sheet type and printing conditions by referring to the table in FIG. 23.

Here, although the control section judged whether the sheet is suited for the Vivid toner based on the sheet type, the control section may judge whether the sheet is suited for the Vivid toner, based on the result of measurement by the device previously provided on the sheet tray accommodating the recording sheet designated by the print job. For example, in cases where the reflection rate of the sheet surface is higher than the prescribed threshold value, or in cases where the whiteness obtained from the spectroscopic characteristics of the reflection light is higher than the prescribed threshold value, if the thickness of the sheet, obtained from the loaded amount and the residual number of the sheet, is greater than the prescribed threshold value, the control section can judge the sheet to be suited for the Vivid toners. In this case the control is possible to lower the above threshold value, if single side copy is designated or the printing is for single sheet, and to raise the above threshold value, if double sided printing is designated or the printing is for multiple sheets.

Thus, in cases where the recording sheet and the printing conditions are judged to be suited for the Vivid toner, control section 21 (printing control program) controls to execute the printing with using the Vivid toners also (if all the images of the printing object are Vivid color, only the Vivid toners are used) (S406). In cases where the recording sheet and the printing conditions are judged to be not suited for the Vivid toner, control section 21 (printing control program) controls to execute the printing with using only the Normal toners (S407).

Figure 21:
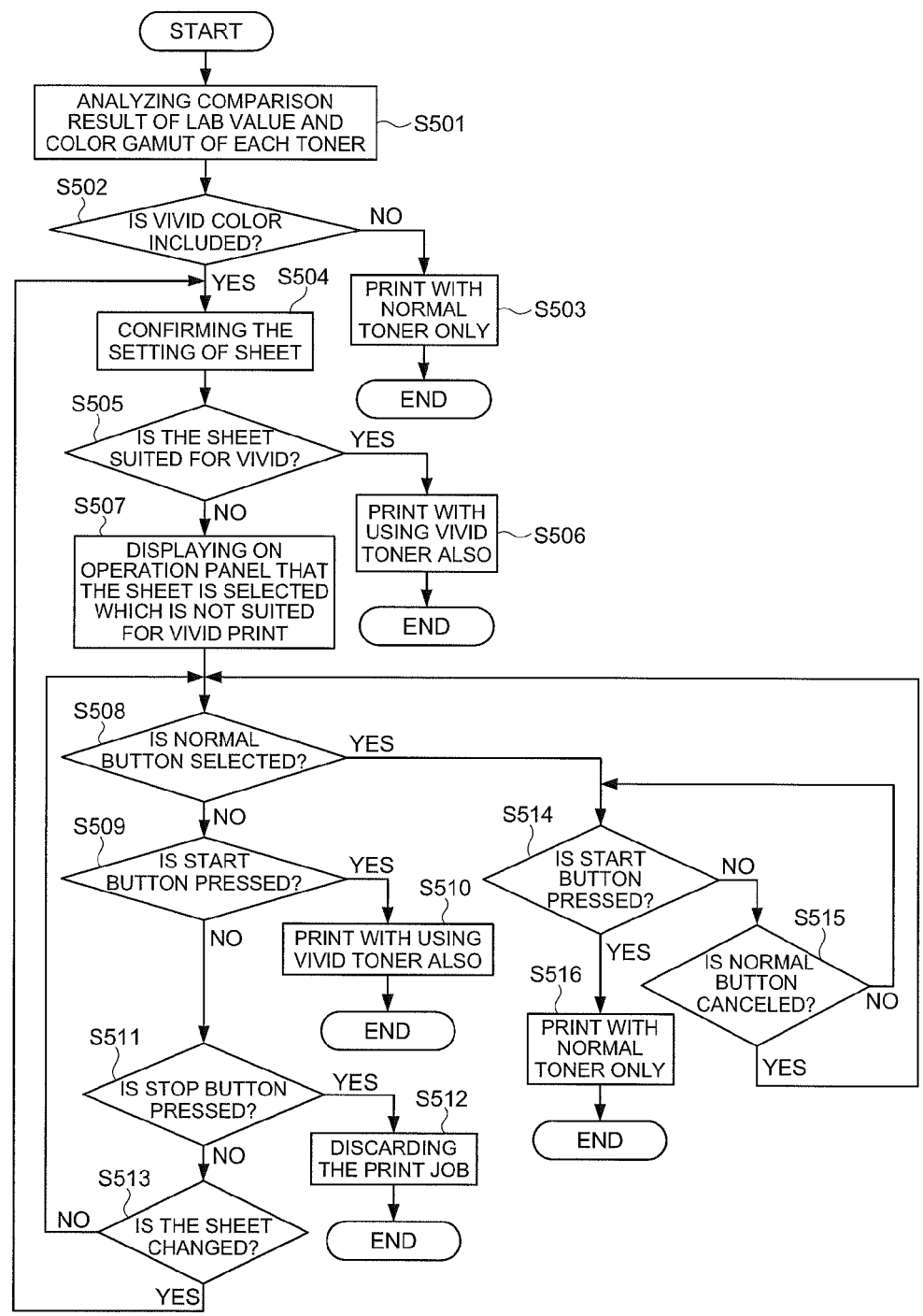
FIG. 21 is a flow chart diagram showing a procedure of printing control in the image forming apparatus relating to an embodiment of the present invention.

Next, the processing in cases where the recording sheet not suited for the Vivid toner is designated, is described referring to the flowchart of FIG. 21 and the example of screen configuration of FIG. 13.

Control section 21 (printing control program) analyzes the comparison result of Lab values and color reproducible range of each toner group (S501), and judges whether or not the Vivid color is included in the image of printing object (S502). If the Vivid color is not included, printing is executed by only using the Normal toners (S503).

On the other hand, in the case of including the Vivid color, control section 21 (printing control program) analyzes print job to confirm the recording sheet and print conditions having been set (S504), and judges whether the sheet and printing conditions are suited for the Vivid toners (S505).

Thus, in cases where the recording sheet and the printing conditions are judged to be suited for the Vivid toner, control section 21 (printing control program) controls to execute the printing with using the Vivid toners also (if all the images of the printing object are Vivid color, only the Vivid toners are used) (S506). In cases where the recording sheet and the printing conditions are judged to be not suited for the Vivid toner, control section 21 (printing control program) controls to temporarily stop the printing procedure and to display the sheet warning screen (refer to FIG. 13) showing that the sheet not suited for the Vivid toner is designated on display section 24 (S507), and waits the operator's instruction.

After that, control section 21 (printing control program) monitors the pressing of the normal button (the button for indicating the printing with Normal toners) in the sheet warning screen (S508), and in cases where the Normal toner printing is selected and after that start button is pressed (S514: Yes), executes the printing with using only the Normal toners (S516). In cases where the selection of normal button is canceled before pressing of the start button (S515: Yes), by returning to S508 continues the monitoring of normal button.

On the other hand, in cases where the start button is pressed without pressing of the normal button (S509: Yes), control section 21 (printing control program) executes the printing with the designated recording sheet (the sheet not suited for the Vivid toner) by using the Vivid toner also (S510).

In cases where the stop button is pressed without the pressing of start button (S511: Yes), control section 21 (printing control program) discards the print job (S512) and finish the processing.

Further, in cases where the sheet is changed by the user according to the sheet warning screen (S513: Yes), returning to the confirmation of sheet setting of S504, the above described processing is repeatedly executed.

Figure 22:
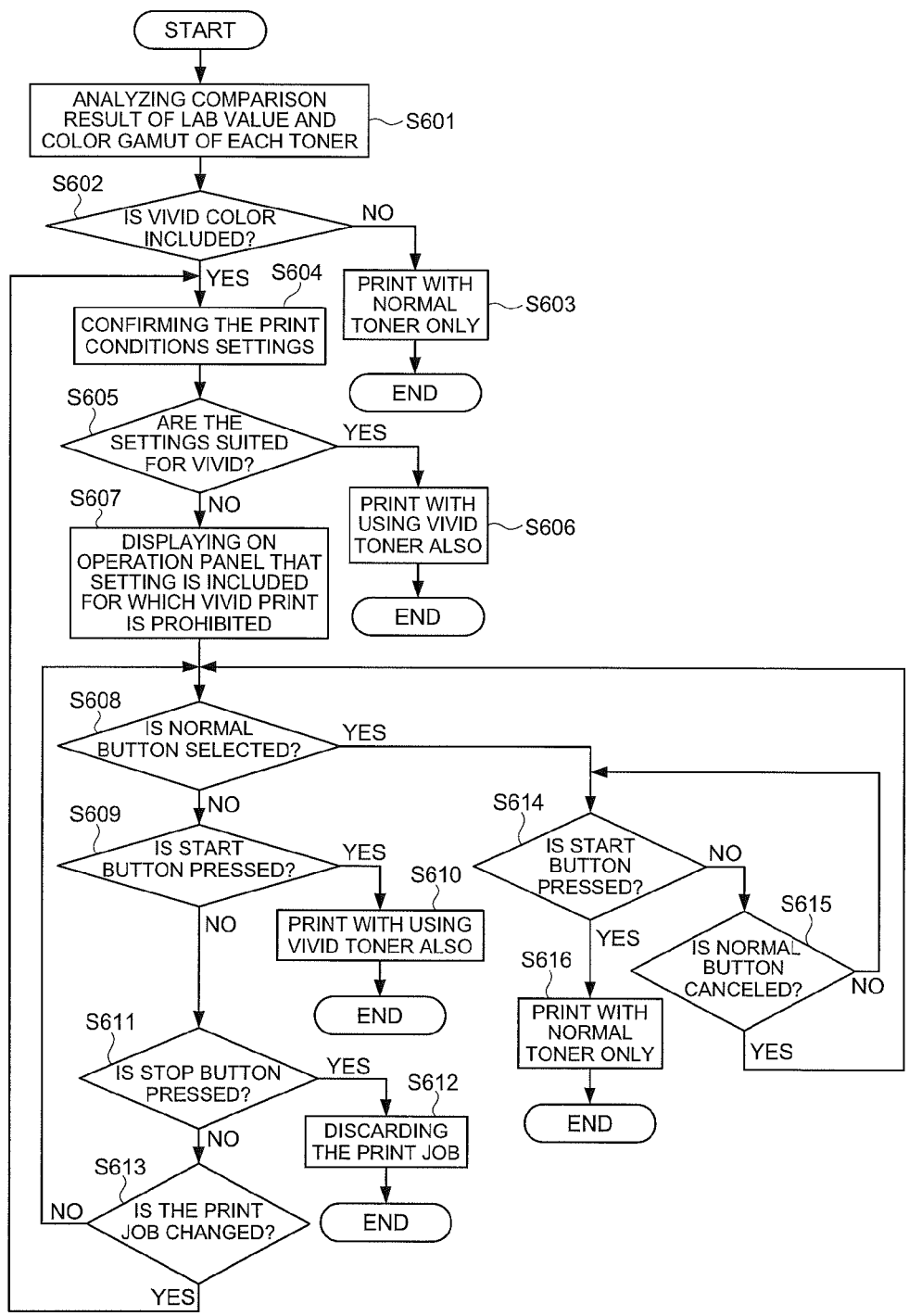
FIG. 22 is a flow chart diagram showing a procedure of printing control in the image forming apparatus relating to an embodiment of the present invention.

Next, the processing, in cases where the printing condition not suited for the Vivid toner is designated, is described referring to the flowchart of FIG. 22 and the example of screen configuration of FIG. 14.

Control section 21 (printing control program) analyzes the comparison result of Lab values and color reproducible range of each toner group (S601), and judges whether or not the Vivid color is included in the image of printing object (S602). If the Vivid color is not included, printing is executed by only using the Normal toners (S603).

On the other hand, in the case of including the Vivid color, control section 21 (printing control program) analyzes print job to confirm the recording sheet and print conditions having been set (S604), and judges whether the designated printing conditions are suited for the Vivid toners (S605).

Thus, in cases where the designated printing conditions are judged to be suited for the Vivid toner, control section 21 (printing control program) controls to execute the printing with using the Vivid toners also (if all the images of the printing object are Vivid color, only the Vivid toners are used) (S606). In cases where the designated printing conditions are judged to be not suited for the vivid toner, control section 21 (printing control program) controls to temporarily stop the printing procedure and to display the print condition warning screen (refer to FIG. 14) showing that the prohibited setting for the Vivid printing is included on display section 24 (S607), and waits the operator's instruction.

After that, control section 21 (printing control program) monitors the pressing of the normal button in the print condition warning screen (S608), and in cases where the Normal toner printing is selected and after that the start button is pressed (S614: Yes), executes the printing with using only the Normal toners (S616). In cases where the selection of normal button is canceled before pressing of the start button (S615: Yes), by returning to S608 continues the monitoring of normal button.

On the other hand, in cases where the start button is pressed without pressing of the normal button (S609: Yes), control section 21 (printing control program) executes the printing with ignoring the prohibited setting for Vivid printing (with the printing conditions not suited for the Vivid toner) by using the Vivid toner also (S610).

In cases where the stop button is pressed without the pressing of start button (S611: Yes), control section 21 (printing control program) discards the print job (S612) and finish the processing.

Further, in cases where the sheet is changed by the user according to the print condition warning screen (S613: Yes), returning to the confirmation of printing condition setting of S604, the above described processing is repeatedly executed.

As described above, according to the present embodiment, printing section 27 of image forming apparatus 20 is loaded with different color reproducibility toner groups of the first toner group (Normal toners) and the second toner group (Vivid toner), the image data of print subject is converted with a prescribed unit into Lab values, the area of the color space where the Lab values belong are judged among the areas of color reproducible range (color reproducibility area) of each toner group, and the toner group suited for the image is judged. Further by referring to the table, the toner group suited for the sheet type or the printing conditions designated by the print job is judged, and based on the result of these determinations, the toner group to be used is determined automatically or by the user's operation. Therefore, the Vivid toners are effectively utilized with suppressing the printing cost.

Although, in the above-described embodiment, the case of using two types of toner groups, the Normal toner group and the Vivid toner group, is explained, the present invention is not restricted to the above embodiment, but three or more toner groups having different color reproducibility can be utilized.

According to the image forming apparatus and the printing control method of the present invention, the printing cost is suppressed and the high chroma toner is effectively utilized.

This is due to that according to the present invention, the image forming apparatus is loaded with a plurality of different color reproducibility toner groups including the first toner group and the second toner group, the image data of print subject is converted into the values in a color space, the converted values of the image data are compared with the areas of color reproducible range of each toner group, and judged is whether the high chroma toner group is needed for reproducing the image. Further judged is that whether the properties of high chroma toner group can be effectively utilized with the designated sheet type or printing conditions, and based on the result of these judgments, the toner group to be used is determined.

The present invention is applicable to an image foiuiing apparatus provided with a plurality of types of toners having different color reproducible ranges, and a printing control method using said image forming apparatus, and a program for said image forming apparatus.

What is claimed is:

1. An image forming apparatus comprising:
   a printing section loaded with a first toner group, and a second toner group having a higher chroma value than the first toner group; and
   a control section which is configured to:
   convert color information of each part of an image based on image data specified by a print job into values in a prescribed color space;
   make a first judgment of a toner group proper to the image by comparing the values in the prescribed color space with color reproducible range of previously registered each toner group of the first and second toner groups;
   make a second judgment of the toner group proper to a recording sheet and/or a printing condition which being specified by the print job, by referring to previously stored correlation information; and
   determine the toner group to be used for printing the image, based on results of the first and second judgments.

2. The image forming apparatus of claim 1, wherein in cases where a color, which is reproducible only by the second toner group, is not included in the image, the control section allows the printing section to print the image with using only the first toner group, regardless of the recording sheet and/or the printing condition.

3. The image forming apparatus of claim 1, wherein even in cases where a color, which is reproducible only by the second toner group is included in the image, the control section allows the printing section to print the image with using only the first toner group, if the recording sheet and/or the printing condition is not proper to the second toner group.

4. The image forming apparatus of claim 3, wherein the recording sheet, which is not proper to the second toner group, includes any one of a sheet with lower glossiness than a prescribed value, a sheet with lower whiteness than a prescribed value, and a sheet with lower thickness than a prescribed value.

5. The image forming apparatus of claim 3, wherein the printing condition, which is not proper to the second toner group, includes any one of double sided printing, single sided printing of multiple sheets, and watermark printing.

6. The image forming apparatus of claim 1 further comprising a display section, wherein in cases where a color, which is reproducible only by the second toner group, is included in the image, the control section allows the display section to display a screen indicating that the recording sheet and/or the printing condition which is not proper to the second toner group is designated, if the recording sheet and/or the printing condition is not proper to the second toner group.

7. The image forming apparatus of claim 6, wherein in cases where execution of printing is indicated on the screen, the control section allows the printing section to print the image with using at least the second toner group.

8. A control method for a system comprising an image forming apparatus provided with a printing section loaded with a first toner group, and a second toner group having a higher chroma value than the first toner group, the control method comprising the steps of:
converting color information of each part of an image based on image data specified by a print job into values in a prescribed color space;
making a first judgment of a toner group proper to the image by comparing the values in the prescribed color space with color reproducible range of previously registered each toner group of the first and second toner groups;
making a second judgment of the toner group proper to a recording sheet and/or a printing condition which being specified by the print job, by referring to previously stored correlation information; and
determining the toner group to be used for printing the image, based on results of the first and second judgments.

9. The control method of claim 8, wherein in cases where in the step of making a first judgment, if a color, which is reproducible only by the second toner group, is judged to be not included in the image, the control method further comprises the step of controlling the printing section to print the image by using only the first toner group, regardless of the recording sheet and/or the printing condition.

10. The control method of claim 8, wherein even in cases where in the step of making a first judgment a color, which is reproducible only by the second toner group is judged to be included in the image, the control method further comprises the step of controlling the printing section to print the image with using only the first toner group, if in the step of making a second judgment, the recording sheet and/or the printing condition is judged to be not proper to the second toner group.

11. The control method of claim 10, wherein the recording sheet, which is not proper to the second toner group, includes any one of a sheet with lower glossiness than a prescribed value, a sheet with lower whiteness than a prescribed value, and a sheet with lower thickness than a prescribed value.

12. The control method of claim 10, wherein the printing condition, which is not proper to the second toner group, includes any one of double sided printing, single sided printing of multiple sheets, and watermark printing.

13. The control method of claim 8, wherein in cases where in the step of making a first judgment, a color which is reproducible only by the second toner group is judged to be included in the image, the control method further comprises the step of displaying a screen indicating that the recording sheet and/or the printing condition which is not proper to the second toner group is designated, if in the step of making a second judgment, the recording sheet and/or the printing condition is judged to be not proper to the second toner group.

14. The control method of claim 13, wherein in cases where execution of printing is indicated on the screen, the control method further comprises the step of controlling the printing section to print the image with using at least the second toner group.

* * * * *